United States Patent [19]

Miller et al.

[11] Patent Number: 4,831,582
[45] Date of Patent: May 16, 1989

[54] DATABASE ACCESS MACHINE FOR FACTORY AUTOMATION NETWORK

[75] Inventors: William L. Miller, Chagrin Falls; Robert E. Horton; Peter J. Hayward, both of Hudson, all of Ohio

[73] Assignee: Allen-Bradley Company, Inc., Milwaukee, Wis.

[21] Appl. No.: 928,529

[22] Filed: Nov. 7, 1986

[51] Int. Cl.$^4$ .................. G06F 13/00; G06F 12/00
[52] U.S. Cl. .................. 364/900; 364/134; 364/138; 364/921
[58] Field of Search ........ 364/468, 300, 900 MS File, 364/200 MS File, 130–138, 146

[56] References Cited

U.S. PATENT DOCUMENTS

| | | | |
|---|---|---|---|
| 4,162,520 | 7/1979 | Cook et al. | 364/200 |
| 4,314,334 | 2/1982 | Daughton et al. | 364/200 |
| 4,413,319 | 11/1983 | Schultz et al. | 364/200 |
| 4,539,655 | 9/1985 | Trussell et al. | 370/87 X |
| 4,628,478 | 12/1986 | Henderson, Jr. | 364/138 X |
| 4,694,396 | 9/1987 | Weisshaar et al. | 364/200 X |

FOREIGN PATENT DOCUMENTS 0174446  3/1986  European Pat. Off. ............ 364/134

Primary Examiner—Gareth D. Shaw
Assistant Examiner—Paul Kulik
Attorney, Agent, or Firm—Quarles & Brady

[57] ABSTRACT

A cell controlling computer is interfaced to a group of station-level computers through an access machine which stores a database of data that is continually being updated from the station-level computers in response to conditions on machines and industrial process equipment. The access machine communicates with the station-level computers using messages addressed to each respective station. The access machine communicates with the cell controlling computer through database operations messages that allow data to be communicated for many stations at once. During on-line reconfiguration, new data items in the station-level computers can be added to the database in the access machine using other database operations messages.

13 Claims, 18 Drawing Sheets

DATA DEFINITION FORM

Tag Name   MOTOR            Type  [BIT]
Description
In Service

────────────── Parameters ──────────────

Station          CONVEYOR
Address - Read
Address - Write  010 00

Polling Class    4
Representation:

────────────── Description ──────────────

Descriptor   conveyor   motor
Primary                          Faceplate
Units                            Format
Range ────────────── Alarm Parameters ──────────────

Class                            Ack. Required

High             Msg.
Low              Msg.
                 Deadband

Type  64 ▎  63                              < 12 >

| f1 NEXT TAG |
| f2 PREV TAG |
| f3 COMMIT |
| f4 DELETE |

FIG. 4a

STATION DEFINITION FORM

Tag Name [CONVEYOR]    Type    STATION
Description
In Service

———————————————— Parameters ————————————————

Access Machine    AM1
Highway Port      02
Station Address   09
Station Type      PLC-2
Tags in Service   YES
Alarms Disabled   YES ———————————————— Description ————————————————

Descriptor    conveyor station
Primary                          Faceplate

| f1 NEXT TAG |
| f2 PREV TAG |
| f3 COMMIT |
| f4 DELETE |

———————————————— Alarm Parameters ————————————————

Class                          Ack. Required
Comm. Error       Msg.
Not in Run        Msg.
Collection Error  Msg.

64    63
Name                                      < 10 >

FIG. 4b

DATA LINK MESSAGE FORMAT

"ADD POINT" MESSAGE
TO ACCESS MACHINE

RETURN MESSAGE
FROM ACCESS MACHINE

Fig. 12
"GET" MESSAGE TO ACCESS MACHINE
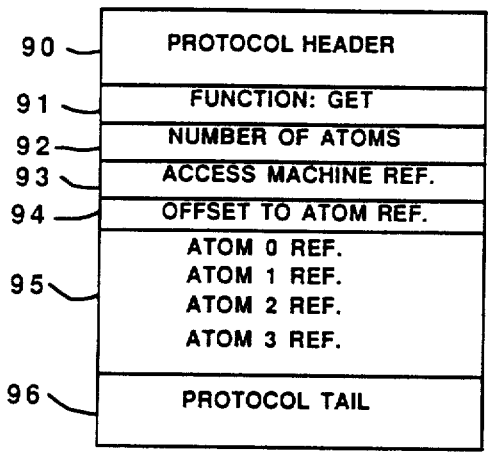
Fig. 14
"PUT" MESSAGE TO ACCESS MACHINE
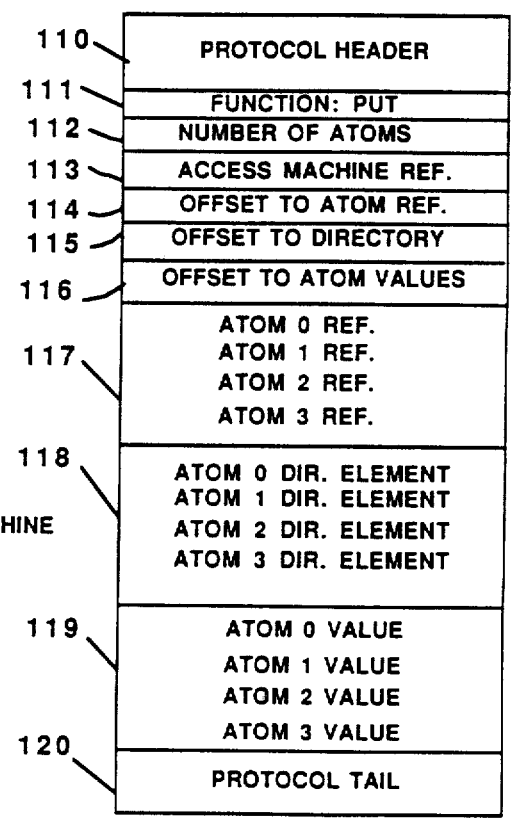
RETURN MESSAGE FROM ACCESS MACHINE
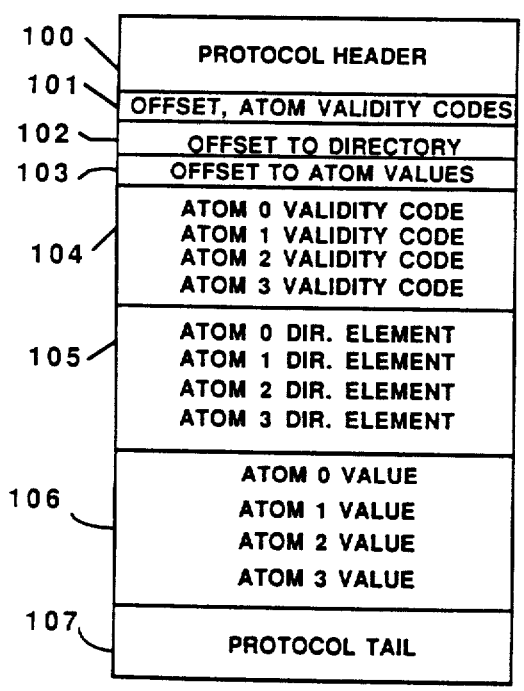
RETURN MESSAGE FROM ACCESS MACHINE
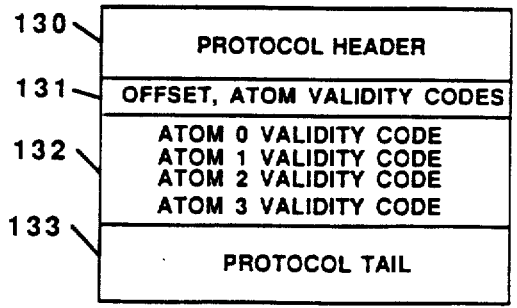
Fig. 13
Fig. 15

DATABASE ACCESS MACHINE FOR FACTORY AUTOMATION NETWORK

BACKGROUND OF THE INVENTION

1. Field of the Invention

The field of the invention is computer equipment for linking a plurality of machine or process controllers in a factory automation network.

2. Description of the Background Art

In factory automation, more complex functions could be performed and coordinated if the programmable or computerized machines presently used to control mechanical equipment could be connected in a network with each other and with higher level supervisory computers. A network would allow the "reconfiguring" of the assembly line by communicating new programs to the programmable systems from a central computer. The network would also provide numerous monitoring and report functions at designated locations and these would provide managers with information to further improve efficiency of manufacturing operations.

Many programmable tools, instruments and control systems are now installed in industry, however, many of these programmable machines cannot communicate with each other. It has been estimated that to establish such communication through custom hardware and software interfaces may account for up to 50 percent of the cost of factory automation.

In anticipation of acquiring a large amount of programmable equipment to automate its factories, certain large manufacturers have established MAP (Manufacturing Automation Protocol). MAP is a seven-layer communications specification for interconnection of general purpose mainframe computer equipment to specialized computer controllers that control individual machines or processes. The MAP standard is not complete at all seven of its layers and is still in the process of development. The MAP standard is also being implemented in phases as equipment has not been available to meet all of the MAP specifications, and new equipment is being designed to provide the MAP-networking capability.

Demonstrations of early phase MAP networks have pointed to possible problems that have not as yet been addressed or solved. One problem has been the time involved in downloading programs and data from supervisory computers to stations on the factory floor. Even if computers are able communicate, communication networks can develop bottlenecks where too many messages are required to accomplish a certain task, where redundant data is being communicated or where too many protocol translations are required. Another problem has been the need for central computers to recompile entire application programs to implement simple changes in data tables or in the arrangement of discrete devices on equipment being controlled by station-level controllers.

When an application program is written on a central computer, items of data or variables stored at station level are represented by certain labels rather than specific addresses or locations in memory where they will be found. When the application program is compiled, the items of data in the program are assigned addresses in the memory of the central computer.

At the stations some data variables are related to the physical connection of devices on the controlled machine. When an additional device, such as a photoelectric sensor, is connected the programmable controller, a new data item is created in the memory of the programmable controller. Other new data items such as timing variables may be created in the memory of the programmable controller without connecting additional devices to the controller.

In one MAP demonstration, the incorporation of the new data item or variable at the station level required a recompilation of application programs and data files at the level of the central computer. In this instance recompilation was required to relate the address or location of the new variable at the station level to an address or location in the data files of the central computer.

Although standardization of communication network standards is an important development, reaching the goals of factory automation will also require innovative solutions such as those offered by the present invention.

SUMMARY OF THE INVENTION

The invention is incorporated in a database access machine for connection in a factory automation cell that includes a cell controlling computer and a plurality of machine controlling computers located at a corresponding plurality of stations. The access machine is also a computer—one that assists communications within the cell.

The access machine stores a database in which data items are organized on a basis that is independent of the addresses which are assigned to the data items for reference by the respective machine controlling computers.

The access machine has a first communication means for accessing the database and for communicating the data items through a first local area network to and from the cell controlling computer via messages in which the information is organized as a portion of the database.

The access machine also has a second communication means for communicating the data items through a second local area network to and from the machine controlling computers via messages which include station-related blocks of information that are organized according to the stations of the respective machine controlling computers.

And, the access machine has a means interfacing the database to the second communication means for translating the organization of data items between the station-related blocks of information and the station-independent organization of the database.

The access machine could be imagined as a huge set of pigeonholes such as those used in an old post office. Station-level devices insert and retrieve information (data, messages, graphic images) from one side of the pigeonholes on a schedule determined by the needs of the control devices. The cell controlling computer inserts and retrieves information from the other side of the pigeonholes on a different schedule determined by the needs of the human interfaces and higher level computers connected through the cell controlling computer. Each pigeonhole is identified by a unique name or tag.

Because the access machine is a computer that is separate from the cell controlling computer, it provides distributed processing. The cell controlling computer handles communication with the user through a work station having a video display, a keyboard and a mouse, while the access machine handles data collection from remote stations. The cell controlling computer and access machines communicate with each other when necessary, but generally the access machine relieves the cell controlling computer of the burden of real-time data collection activities. The cell controlling computer can therefore concentrate on its user interface functions.

The invention also enables the cell controlling computer to add or delete items from the database while the access machine remains "on-line" and in control of machine controlling computers. This is referred to as "on-line reconfiguration".

The invention removes any need to recompile application programs or to reorganize large amounts of data in the cell controlling computer when simple changes are made to the arrangement of equipment at the stations. The invention also provides the basis for avoiding similar problems in higher level computers supervising the operation of the cell controlling computers.

Other objects and advantages besides those discussed above shall be apparent to those skilled in the art from the description of a preferred embodiment of the invention which follows. In the description, reference is made to the accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4a shows the screen of the video display of FIG. 3 as a new data item is being entered into the database of the access machine of FIG. 3;

FIG. 4b shows the screen of the video display of FIG. 3 as a new station record is being entered into the database of the access machine of FIG. 3;

FIGS. 9-15 are maps of the database-related information contained in messages communicated between the cell controlling computer and the access machine in FIGS. 7 and 8;

DETAILED DESCRIPTION OF THE PREFERRED EMBODIMENT

Figure 1:
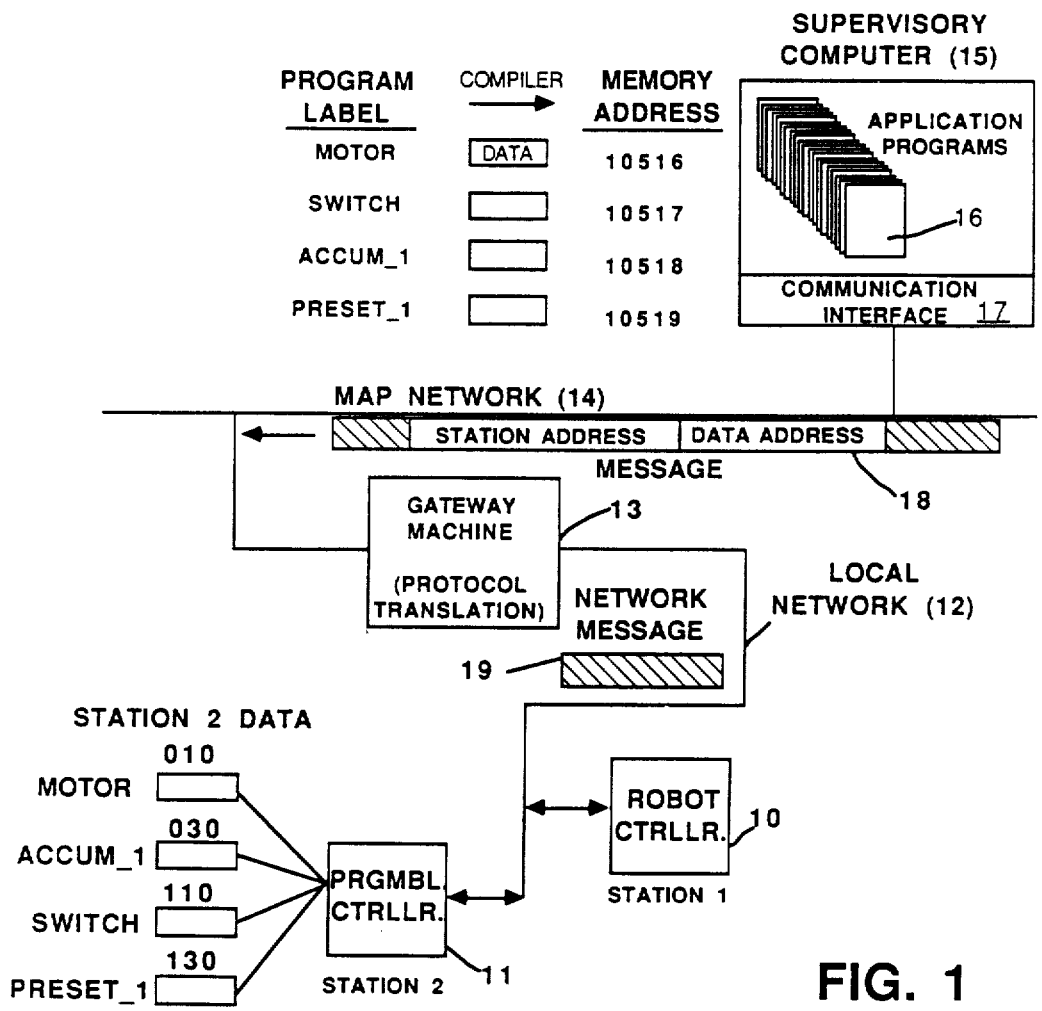
FIG. 1 is a data flow diagram showing the propagation of data in a control system provided by the background art.
Figure 2:
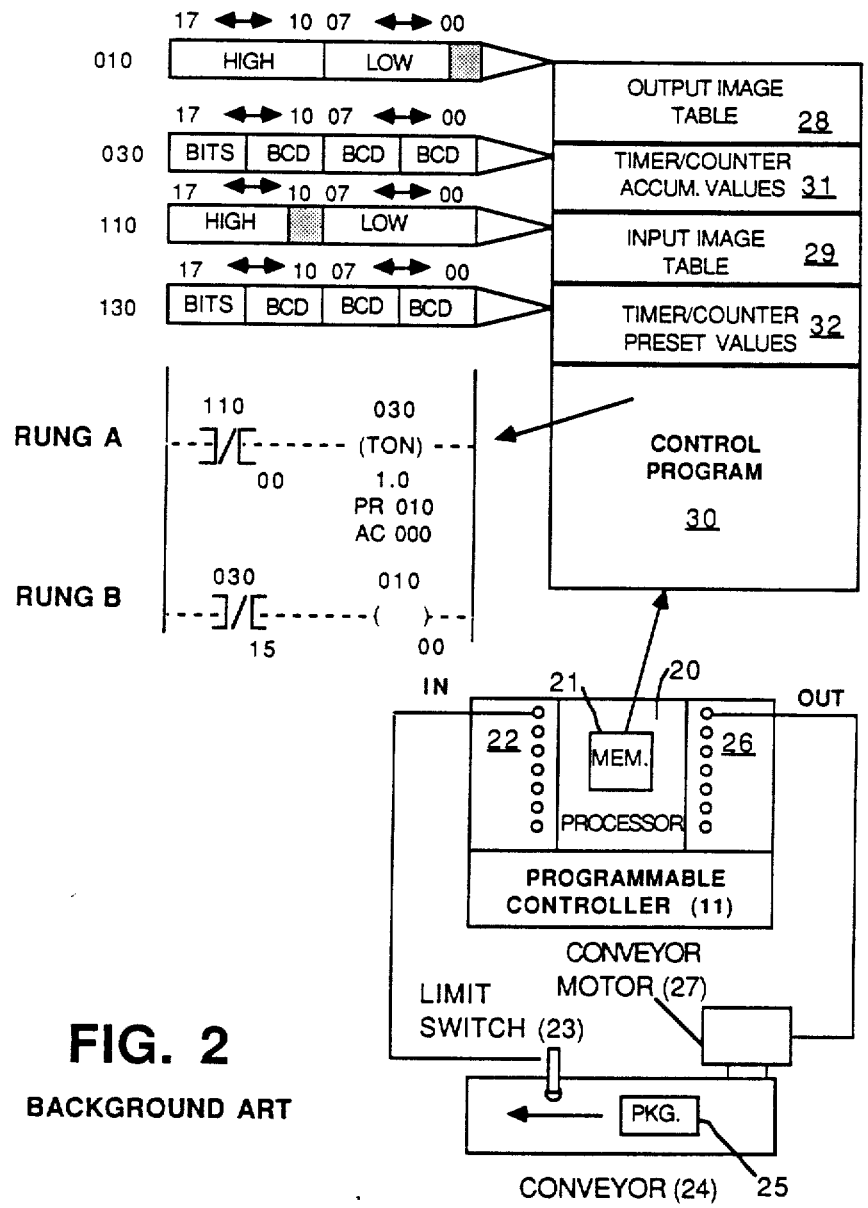
FIG. 2 is a hardware-to-memory map schematic diagram of a programmable controller of a type known in the art.

FIGS. 1 and 2 show a system representing the art prior to the invention. A plurality of station-level devices such as a robot controller 10 at Station 1 and a programmable controller 11 at Station 2 are connected via a first local network 12 to a gateway machine 13. The gateway machine 13 in turn is connected via a second network 14 to a supervisory computer 15 which may be of the mainframe or minicomputer class. The second network 14 conforms to the layers 1-3 of the MAP standard and in particular provides a token-passing broadband network conforming to IEEE Std. 802.4.

The supervisory computer 15 executes a number or application programs 16 which utilize a hardware and software communication interface 17 to send and receive messages 18 over the second network 14. The data in these messages is organized as a series of bytes according to a protocol meeting the MAP standard. As an example, it shall be assumed that four words of data are of particular interest. In the application programs these will assigned labels of MOTOR, SWITCH, ACCUM_1 and PRESET_1. These four words of data correspond to four items of data stored in the memory of the programmable controller 11 at Station 2.

There are two basic issues in handling the four words of data labeled MOTOR, SWITCH, ACCUM_1 and PRESET_1. The first issue is how to organize and store the data in the memory of the supervisory computer 15 in relation to its location in the programmable controller 11 at Station 2. The second issue to how to organize the data for communication between the supervisory computer 15 and the programmable controller 11.

The labels are assigned to the four items of data when an application program 16 is written in source code. When the application program 16 is compiled to object code, the data variables in the program 16 are assigned addresses in the memory of the supervisory computer 15, such as 10516-10519 (hex) based on the set of addresses available to the CPU within the supervisory computer 15. When this data is communicated to the programmable controller 11, it is organized in a message 18 with a station address. The station address is detected and compared by the stations to determine that a message is being sent to it. When the programmable controller 11 communicates the data in the other direction—to the supervisory computer 15—the programmable controller 11 includes an address for the supervisory computer 15 in the message.

Typically, the gateway machine 13 is "initialized" during startup operations to recognize the addresses of the supervisory devices and station-level devices with which it must communicate. The gateway machine 13 may store message data for the respective stations in assigned areas of its memory while it is performing protocol translation and other message handling functions. It may store message data moving downstream to the stations in one set of memory areas and message data moving upstream to the supervisory computer 15 in another set of memory areas. For messages 18 moving downstream, the station addresses are carried through to messages 18 on the local network 12. For messages moving upstream an address for the supervisory computer 15 is usually included in the messages returned through the MAP network 14.

Besides a station level address, each item of data has a particular address where it is located within the station. This address may be expressed as a higher-level user program address or as a lower-level machine address. The user programming address is expressed in the octal numbering system which has been developed for programmable controllers. The addresses "010", "030", "110" and "130" are the user programming addresses for the four items of data to be communicated to and from Station 2. These user programming addresses are translated within the programmable controller 11 to a set of machine-level addresses used by the microelectronic CPU within the programmable controller 11. For purposes of this discussion, reference will be made to the user programming addresses.

In the prior art exemplified in FIG. 1, some form of data addressing or identification is provided for each item of data in addition to the station-level address. A message is formed with station-level and data-level addresses and is sent from the supervisory computer 15 to the programmable controller 11, with any necessary protocol translations being made along the way. This would require considerable time for the values of data items in the memory of the supervisory computer 15 to be sent downstream to the programmable controller 11 and for the values of data times in the memory of the programmable controller 11 to be sent upstream to the memory of the supervisory computer 15. If the data items were located at four different stations, the number of messages and comunication time would be multipled by a factor of four.

FIG. 2 illustrates the nature of the particular data items in this example. The programmable controller 11 is connected to control a conveyor motor 27 in delayed response to signals from a limit switch 23. The delay has been incorporated solely for the purposes of illustrating the different types of data in the controller 11, and this example should not be taken as a suggested program for reallife operation of such equipment.

The programmable controller 11 includes a processor 20 with a main memory 21 for storing the data items. The processor 20 is connected through an input module 22 to the limit switch 23. The limit switch 23 contacts are normally closed. These contacts will be opened when the switch arm is contacted by a package 25 moving along the conveyor 24. This will change the logic state of a signal that is sent to the processor 20 through the input module 22. The processor 20 is also connected through an output module 26 to a motor 27 for moving the conveyor 24. The processor 20 can generate a signal to start the motor 27, and in response to the opening of the limit switch contacts, and after a programmed delay, it will remove the signal to stop the motor 27 and the conveyor 24.

To accomplish this operation, a status bit of data that represents the state of the limit switch 23 is stored in an input image table 29 in the memory 21 of the programmable controller 11. The status bit for the limit switch 23 is stored at bit "10" (octal) in the high byte of a 16-bit data word at address "110". A status bit of data that represents the "on" or "off" state of the motor 27 is stored in an output image table 28 of the memory 21. The status bit for the motor 27 is stored as bit "00" in the low byte of a 16-bit data word at address "010" (octal). The processor 20 executes a control program 30, which is represented in the symbolic language that has been developed in the art of programmable controllers, to check the input status of the limit switch 23 and set the output status of the motor 27 according to the logic of the program 30.

The execution of the control program is sometimes referred to as the control program "scan". The processor 20 also periodically executes an "I/O scan" to read the status of the limit switch 23 and to control the operating state of the motor 27. The I/O scan is executed many times per second so that the response of the programmable controller 11 to actual operating conditions on the conveyor 24 appears instantaneous to the naked eye.

Status bits representing physical devices such as the limit switch 23 and the motor 27 are one type of data used by a programmable controller 11. Another type of data exists in the memory 21 of the programmable controller 11, but does not correspond too an external physical device. This type of data is exemplefied by the preset and accumulated values for timers and counters.

As seen in the memory map of FIG. 2, the output image table 28 is followed by an area 31 for storing the accumulated values for timers and counters that begins as address "030" (octal) in the memory 21. The accumulated value ACCUM_1 is stored at word "030" as three binary-coded decimal (BCD) digits with four control bits as the four highest order bits (bits "17"-"14"). Preset values for the timers and counters are stored in an area 32 following the input image table 29. The preset value PRESET_1 is stored at word "130" as three binary-coded decimal (BCD) digits with four control bits as the four highest order bits (bits "17"-"14").

With this background, the function of the timer and counter data can be explained with reference to the example control program, which is presented in a ladder diagram with two rungs, Rung A and Rung B. If all of the conditions in a rung are "true", then an output action for the rung will be executed. The first and only conditional instruction in Rung A is an XIO instruction for the limit switch 23. The XIO instruction is interpreted as "examine the limit switch status bit at bit "00" of memory location "010" to see if the limit switch contacts are opened." If so, the condition is satisfied, and the output action represented by the next instruction is executed. The next instruction in Rung A is a TIMER ON DELAY (TON) instruction.

The TIMER ON DELAY (TON) instruction is represented in the ladder diagram program as follows. The "030" above the symbol "(TON)" means that the accumulated value for this program timer is stored at address "030" (octal) in the memory 21. The number "1.0" below the symbol "(TON)" means that the timer is operated at 1.0 second time base. Each time the timer runs for a second the accumulated count is advanced by one. The legend "PR 010" means that the preset number is a decimal "10", and that after 10 counts the accumulated value will equal the preset value to indicate that the timer has timed out. When this occurs bit "15" (octal) in word 030 will be set.

To summarize Rung A of the ladder diagram program, if the limit switch contacts are open for 10 seconds elapsed time, set bit "15" in data word "030" to signal completion of a timing cycle. In Rung B, a second XIO instruction is programmed with an "energize output" (OTE) instruction. When this rung is true, this instruction will maintain the output status bit "00[ of word "010" in a set state to energize the motor 27. When the XIO instruction becomes false (signalling the timer has timed out) Run B is interrupted and the motor status bit is reset to deenergize the motor 27. Of course, other logic instructions would be added to this example to be sure that the motor did not run continuously.

As seen from the above example, the status bits in the input and output image tables 28,29 are related to physical devices on the controlled machine. The locations in the programmable controller memory 21 correspond to terminals on the input and output modules 22, 26 so that status data can be transmitted between the processor 20 and the physical devices during the I/O scan. The I/O address of the limit switch 23 and the motor 27 and the address of their status bits in memory depends upon which terminals on the input module 22 and output module 26 are wired to the limit switch 23 and to the motor 27. When an additional device, such as a photoelectric sensor, is connected to a terminal on the programmable controller 11, a new data item is created in the memory of the programmable controller 11.

The preset and accumulated values for timers are program data variables rather than "status" data variables corresponding to the the physical connection of control devices on the conveyor 24. Nevertheless, the programming of such values creates new data variables with an address in the memory of the station level device.

Returning to FIG. 1, it can now be appreciated that new data variables can be created at Station 2 in several ways. An application program 16 might be written for the supervisory computer 15 to monitor execution of the user control program at Station 2 and depending upon the status of certain variables at Station 2, it might signal the robot controller at Station 1 to begin execution of a user control program. If, however, a new variable is added to the variables MOTOR, SWITCH, ACCUM_1 and PRESET_1, there had not been an easy way to alter the application program 16 without recompiling the application program 16 to assign a new memory location to hold the value of the new variable.

Besides the recompilation problem, the system in FIG. 1 causes a great number of messages to be communicated, where there are many application programs 16 and many more stations than shown. The large number of communication messages lengthens the system response time in the real-time factory environment.

Figure 3:
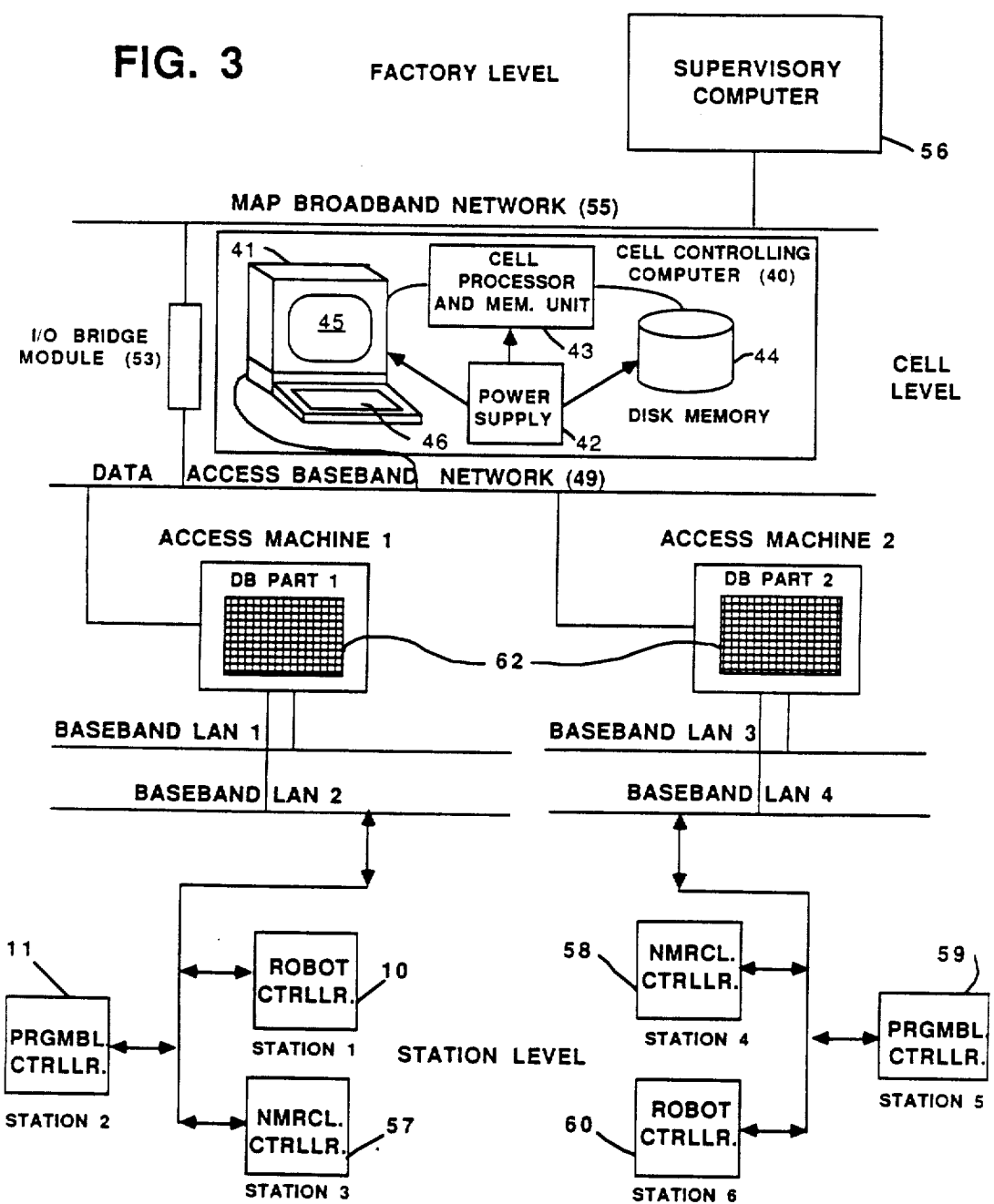
FIG. 3 is a block diagram showing the management of data items in a factory cell automation system that incorporates an access machine of the present invention.

In FIG. 3, there are two levels or tiers above the station level as compared with one higher level in FIGS. 1 and 2. A cell controlling computer 40 is located at a cell level that is one level above the station level. The cell controlling computer 40 is connected for communication with a supervisory computer 56 at the factory level through an I/O bridge module 53. The supervisory computer 56 may be of the mainframe or minicomputer class.

The cell controlling computer 40 comprises a work station 41, a power supply unit 42, a cell processor and memory unit 43 and a hard disk memory unit 44. These units 41–44 are housed in separate enclosures. The control center or brain of the cell computer system is the cell processor and memory unit 43. This unit 43 contains processor and memory modules. Within the processor module is a microelectronic CPU from the 68000 Series of CPU's manufactured by Motorola, Inc. of Phoenix, Ariz., and Austin, Tex. The memory modules contain four megabytes (8 Mb) of random access memory (RAM) storage capacity. The work station 41 and the hard disk memory unit 44 are peripherals connected to the cell processor and memory unit 43. The power supply unit 42 provides power to the other units in the system. The work station 41 includes a color video display 45 and a separate keyboard 46 and mouse (not shown). The hard disk memory unit 44 provides seventy-one megabytes (71 Mb) of storage capacity and is useful for saving application programs, databases and other data files and reloading these items into the 8-megabyte RAM on startup.

The cell controlling computer 40 is compatible with the Series 5500 Computer Systems available from Massachusetts Computer Corporation, Westford, Mass. It runs under the UNIX operating system available from AT&T Bell Laboratories, Short Hills, N.J.

The cell controlling computer 40 is connected through a data access baseband network 49 to two access machines of the present invention, referred to as ACCESS MACHINE 1 and ACCESS MACHINE 2. The baseband network 49 is a carrier sense multiple access/collision detection (CMSA/CD) type as specified in IEEE Std. 802.3.

The IEEE 802.3 specification is a development of the Ethernet Version 1.0 specification, published by DEC, Intel and Xerox on Sept. 30, 1980. The IEEE 802.3 specification has three additional features:

HEARTBEAT, which requires the transceiver to send back a "heartbeat" signal to the controller immediately after the successful transmission of a packet;

JABBER, a transceiver function which requires that the transceiver stop transmission if the controller attempts to transmit a packet of much greater length than allowed by the specification (12,144 bits plus preamble); and HALFSTEP SIGNALLING which allows the transceiver to be used with controllers having AC-coupled input/output circuits.

The data access baseboard network (49) consists of the following functional blocks:

1. A passive broadcast medium (coaxial cable),
2. A transceiver (transmitter-receiver for the coaxial cable),
3. Connectors for connecting transceivers to a coaxial cable segment and for connecting coaxial cable sections together,
4. A channel clock,
5. A channel data encoder and decoder,
6. A preamble generator and remover, and
7. Carrier and collision detect circuits.

The coaxial medium is the common element in the entire network. A transceiver is required for each station connected to the medium.

The data access baseboard network 49 is connected through an I/O bridge module 53 to a broadband network 55 conforming to the MAP protocol as specified to date and conforming to IEEE Std. 802.4 for a token-passing bus network. Through the MAP network 55, the cell controlling computer is connected to the factory level supervisory computer 56.

A system database 62 is stored in the cell controlling computer 40 and would be substantially duplicated in ACCESS MACHINE 1, if it were the only access machine in the system. The system database 62 can be expanded through ACCESS MACHINE 2, so that PART 1 of the system database 62 is stored in ACCESS MACHINE 1 and PART 2 of the system database 62 is stored in ACCESS MACHINE 2. The database 62 serves as an interface between a plurality of station-level devices 10, 11 and 57-60 and the cell controlling computer 40.

The programmable controller 11 at Station 2 is connected to ACCESS MACHINE 1 through one of two baseband local area networks (LAN's), referred to as BASEBAND LAN 1 and BASEBAND LAN 2 in the drawing. Information, including the four items of data discussed in relation to FIGS. 1 and 2, is communicated through BASEBAND LAN 2 between the programmable controller 11 at Station 2 and ACCESS MACHINE 1, where it is reorganized according to the structure of the database 62. The preferred networks are offered under the trade designation Data Highway by Allen-Bradley Company, Inc. of Highland Heights, Ohio. For a description of the construction and operation of these networks, reference is made to Grudowski et al., U.S. Pat. No. 4,319,338, issued Mar. 9, 1982, and the commercial literature available from Allen-Bradley Company, Inc.

During startup operations, the database 62 is downloaded from the cell controlling computer 40 to ACCESS MACHINE 1. As operations continue, messages are transmitted over the data access baseband network 49. As will be explained in more detail later herein, the character of these messages is substantially different than the messages discussed earlier in relation to FIGS. 1 and 2 and substantially different than the character of the messages transmitted over BASEBAND LAN 2 to and from the programmable controller 57. The messages transmitted over the data access baseband network 49 are organized as database operations messages.

As seen in FIG. 3, a second access machine, ACCESS MACHINE 2, can also be connected to the data access baseband network 49. PART 2 of the database 62 is downloaded to ACCESS MACHINE 2 through the baseband network 49. This part of the database 62 serves as an interface to station level devices 58-60 which communicate with ACCESS MACHINE 2 through BASEBAND LAN 4. Still other station-level devices can be interfaced to the database 62 and ACCESS MACHINE 2 through BASEBAND LAN 3.

As explained in relation to FIGS. 1 and 2, there is a problem in the art of multiple-tier computer systems in relating the addresses of data items in a higher level computer to the addresses of the same data items in a station-level device. The transportation and translation of messages from the highest level to the lowest level of the system slows system response time.

The invention provides a database machine as an interface between the station level devices and higher levels of the system. The database is constructed to serve the entire system with each item of data in the computer system of FIG. 3 being assigned a "tag", or global identifier. The tag provides an identifier of the type used in database operations and also serves as a convenient cross-reference for relating the item of data to various address locations in various machines in the computer system.

Generally, a database is organized with different types of data files. Data files are the largest groupings of information in the database. A database management program organizes the links and relationships between separately identified files. Within a file are a plurality of records and within each record are a number of fields which are the headings for items of information in the record. One of the fields is usually designated as an identifier, and the identifier field is included in each record that is to be linked to the identifier. In the present computer system, the identifiers are the tag names.

Some particular records used by the database 62 are illustrated in FIG. 4a. Information is entered into the system through the work station keyboard 46 and reviewed on the video display 45. FIG. 4a shows the record creation form as it would be viewed on the video display 45.

One by one the field or "atom" labels are highlighted on the screen. The name of the highlighted field ("TYPE") appears next to a cursor field 63 at the bottom of the screen 45, where letters are typed in as a cursor 64 moves from left to right to indicate the location of the next letter. Also shown in the cursor field 63 between the symbols "< >" is the number of characters allowed in the field. When the information has been entered and verified to the satisfaction of the user, the "f3 COMMIT" command is entered to add the record to the files in the database 62. The labels "f1 NEXT TAG . . . f4 DELETE" in FIG. 4a signify commands that can be entered by operating keys "f" and "1" or by touching the screen where the command is displayed.

A record is created for each data item such as the four data items in the programmable controller 11 described in FIGS. 1 and 2. As seen in FIG. 4a, the fields are grouped in four sections which include a general section, a parameter section, a description section and an alarm parameter section. Within the general section, for example, there are fields for tag name, data type, a textual description and "in service" status. The "Tag Name" assigned to the MOTOR data item from FIGS. 1 and 2 is "MOTOR". Some of the various types of data items for the "Type" field are BIT, NUMBER, TEXT. A logical bit in the memory of the programmable controller 11, such as the MOTOR status bit would be of the BIT data type. An accumulated value for a timer such as the ACCUM_1 value would be a NUMBER data type. Data that is transmitted in ASCII format to be displayed on the screen of the CRT as an English-language phrase would be of the TEXT data type.

A record is also generated for each station in the system and the form for creating such a record is seen in FIG. 4b. The station also receives a tag name, which in this example is CONVEYOR. This tag is identified as a station tag by the term STATION that is entered in the "Type" field. Other fields for the station record are grouped within a parameter section, a description section and an alarm parameter section. It should be noticed that the station tag is also entered as one of the fields in the parameters section of the form in FIG. 4a for creating data item records.

Figure 5:
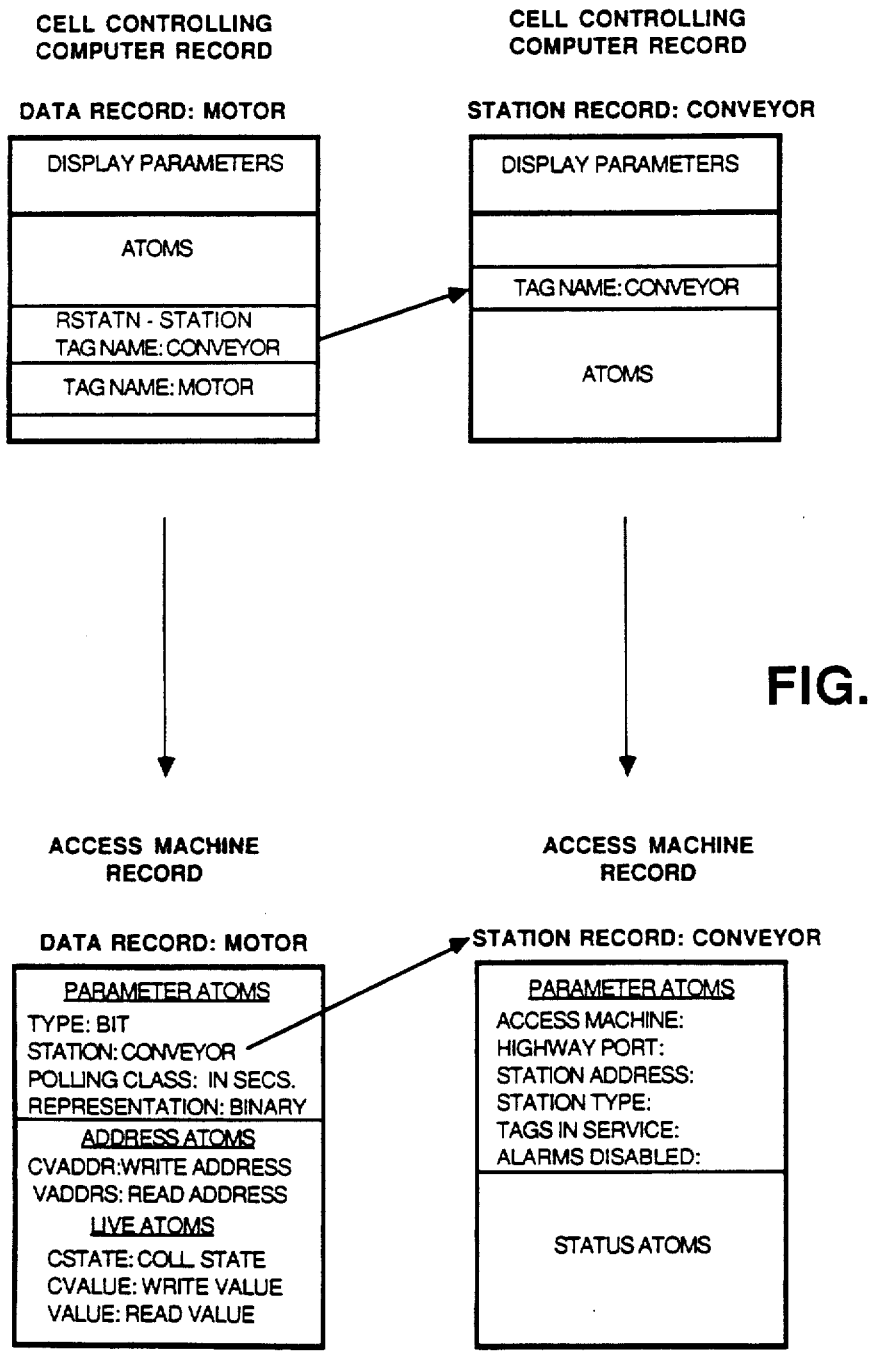
FIG. 5 is a map diagram showing the relationship of certain records in the database maintained by the cell controlling computer and the access machine of FIG. 3.

FIG. 5 shows how the station identifier is used to relate the station record to all of the records of data items at a particular station. A tag name such as MOTOR has been entered to identify a data item record corresponding to the MOTOR status bit in the programmable controller 11 at Station 2. The station identifier "CONVEYOR" has been entered to identify the location of the data item. Four records can be created for the data items MOTOR, ACCUM_1, SWITCH and PRESET_1 shown in FIGS. 1 and 2, and all cross-referenced to the station record for the "CONVEYOR" station. In this way all data item records can be related to a particular station and to the information in the station record without repeating the station information in each data item record.

FIG. 5 also shows how the information entered in the forms of FIGS. 4a and 4b is stored in records in the cell controlling computer 40 and in the access machines. These records contain a number of fields, which are also referred to as "atoms". The following is a list, in alphabetical order, with short descriptions, of the some of the atoms commonly found in the various records which shall be discussed later.

CSTATE Atom—this atom is a read-only atom which indicates certain status information about a data item, such as whether the data item has been updated the first time, whether the data item is being updated at the desired rate, and whether the data is valid.

CVADDR Atom—this atom represents the remote station table address of the CVALUE (command value) atom.

CVALUE Atom—this atom represents a command value that can be written to a data item.

INSERV Atom—this atom is bit-oriented, two-state atom that signals whether the data item is operational.

RATE Atom—this atom is a code representing a scan class category for updating the data item.

RMTFMT Atom—this atom indicates the numbering system in which the data is represented, such as 3-digit BCD, 16 bit unsigned binary, single bit binary, ASCII code or one of the representations used for timers and counters in programmable controller 11.

RSTATN Atom—this atom is a tag name of the network station from which the data item is to be collected.

TAG Atom—this is the data item global identifier.

TYPE Atom—this atom is a description of the type of data identified by the TAG atom. This description may be at the data item level such as the types BIT, TIMER or TEXT, or the description may be at a system level such as a STATION.

VADDRS Atom—this is a station data table address for the VALUE atom.

VALUE Atom—this atom is either a default value or the collected value for a data item As seen in FIG. 5, each data item record in the cell controlling computer 40 includes display parameters for viewing the record on the video display of the work station 41. These display parameters include the fields seen in the "Description" section of the screen 45 seen in FIG. 4a. This information is not needed by the access machines, so it is not downloaded with the other data in the record. On the other hand, the data entered in the fields in the "Parameters" section of the screen 45 seen in FIG. 4a, relates to the record as it is used in the access machines to collect data from the stations. The parameter fields include data type (e.g., BIT, NUMBER), the station identifier (CONVEYOR), a polling class (e.g., 1-6), and the form of alphanumeric representation (e.g., BINARY, 3 BCD). In addition, the record in the access machine may includes a READ address (VADDRS) and a WRITE address (CVADDR), so that data can be read from one address at a station and written to another. The read and write address can be the same.

Aside from the descriptive and parameter atoms, the records in both the cell controlling computer 40 and access machines contain a number of active fields or "live" atoms, which may be modified in real time response to changing conditions on the controlled conveyor. The live atoms are those such as the collection state (CSTATE) atom, the write value (CVALUE) atom and the read value (VALUE) atom.

The station records in the cell controlling computer 40 also contains atoms for the description fields seen in FIG. 4b and these are not needed by the access machines. The parameter atoms for a station record are somewhat different than for a data item record as seen in FIG. 5. The parameter atoms include an identifier for the access machine connected to the station, the network port to which the station is connected, the station address, the station type, a tags "in or out of service" atom and an alarms enabled/disabled status atom. The other atoms in the station record may also be considered to be status atoms. The station record does not include "live" atoms.

Figure 6:
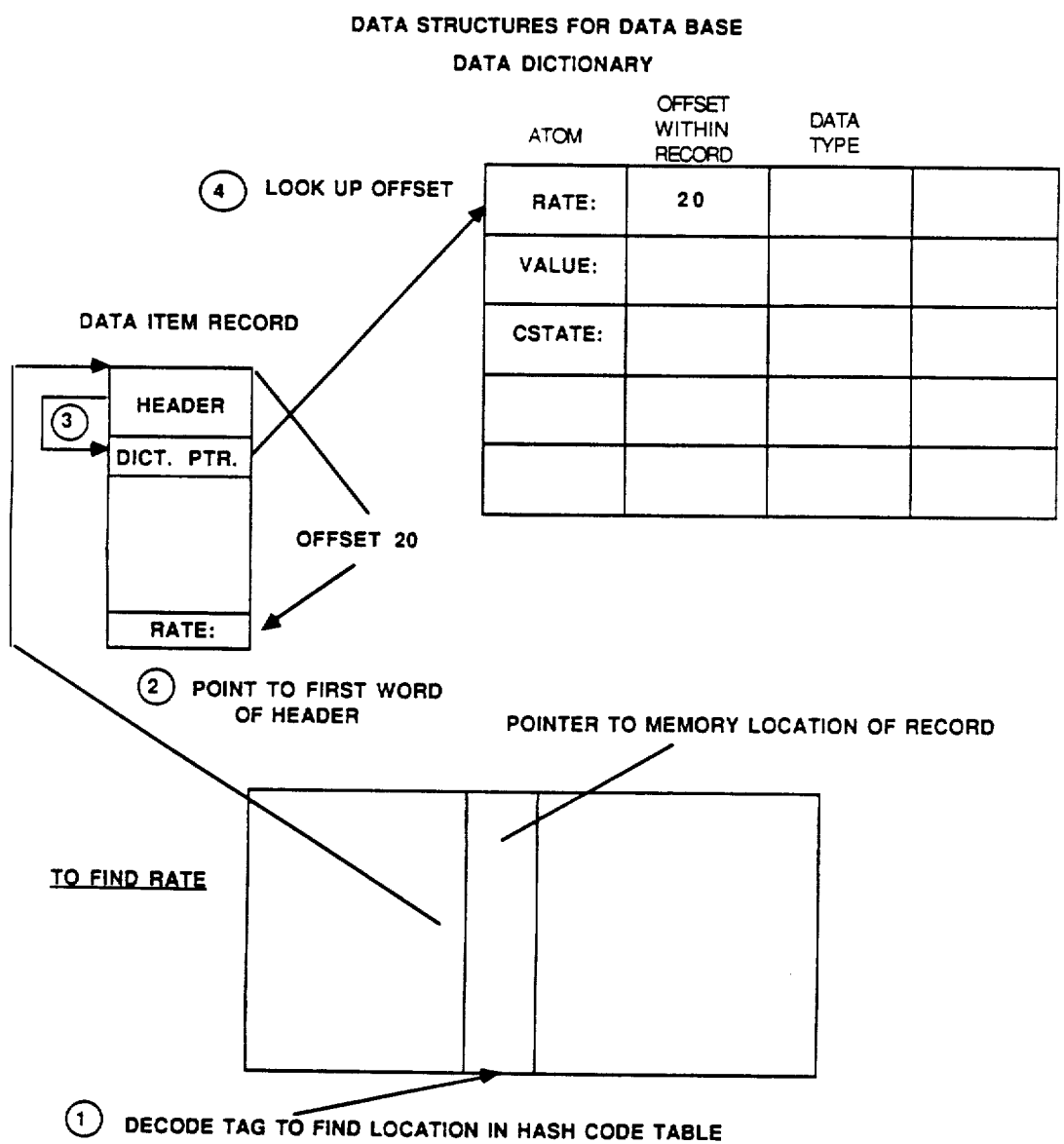
FIG. 6 is a map diagram showing the organization of data items in a database residing in the access machine of FIG. 3.

FIG. 6 illustrates the manner in which the data item records are organized and accessed in the database 62. A mathematical function of the type known in the art as a "hash function" is applied to the tag atom to generate a computed memory address in a hash code table seen in FIG. 6. At this address a pointer or second address is stored and this address is the address of the first data word in the record. The data item record has a header with a pointer (in this case a number representing an offset from the first data word) to a data dictionary pointer. A data dictionary is provided for each "type" of record, such as BIT, NUMBER or STATION, and this dictionary is stored in another location in memory and linked through the data dictionary pointers to the numerous records of its specific type. The data dictionary includes a list of the atoms in a particular type of record and their location (by offset from the beginning of the record) within the record. The data dictionary may also include other information about the atom such an atom type. After looking up the offset a particular atom value can be accessed in a record.

Hashing allows records to be added to memory in a mathematical though non-contiguous and non-consecutive fashion. It is thus possible to insert a new record in the database 62, and give it the appearance of being related to a consecutive system of station level addresses, while in fact storing and retrieving the record from a random location in memory.

As mentioned earlier, there are different types of records according to the TYPE atom. For each type of record, the database 62 includes a data dictionary. In the following data dictionaries, certain atoms related to an alarm function have been deleted, as that enhancement is not necessary to the basic invention described herein.

Figure 7:
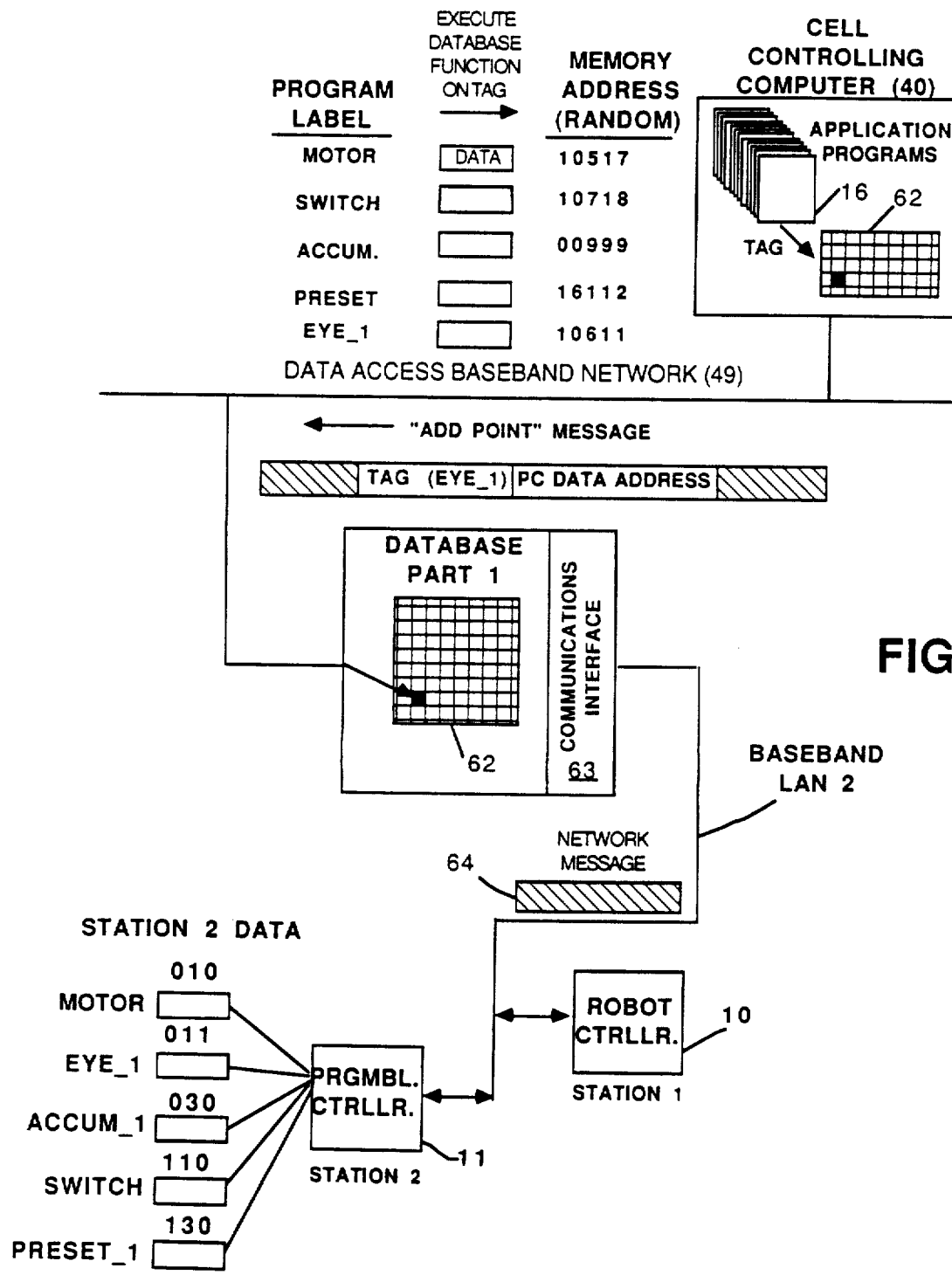
FIG. 7 is a data flow diagram showing the communication of one type of database-related information in a system that incorporates the access machine of FIG. 3.
Figure 8:
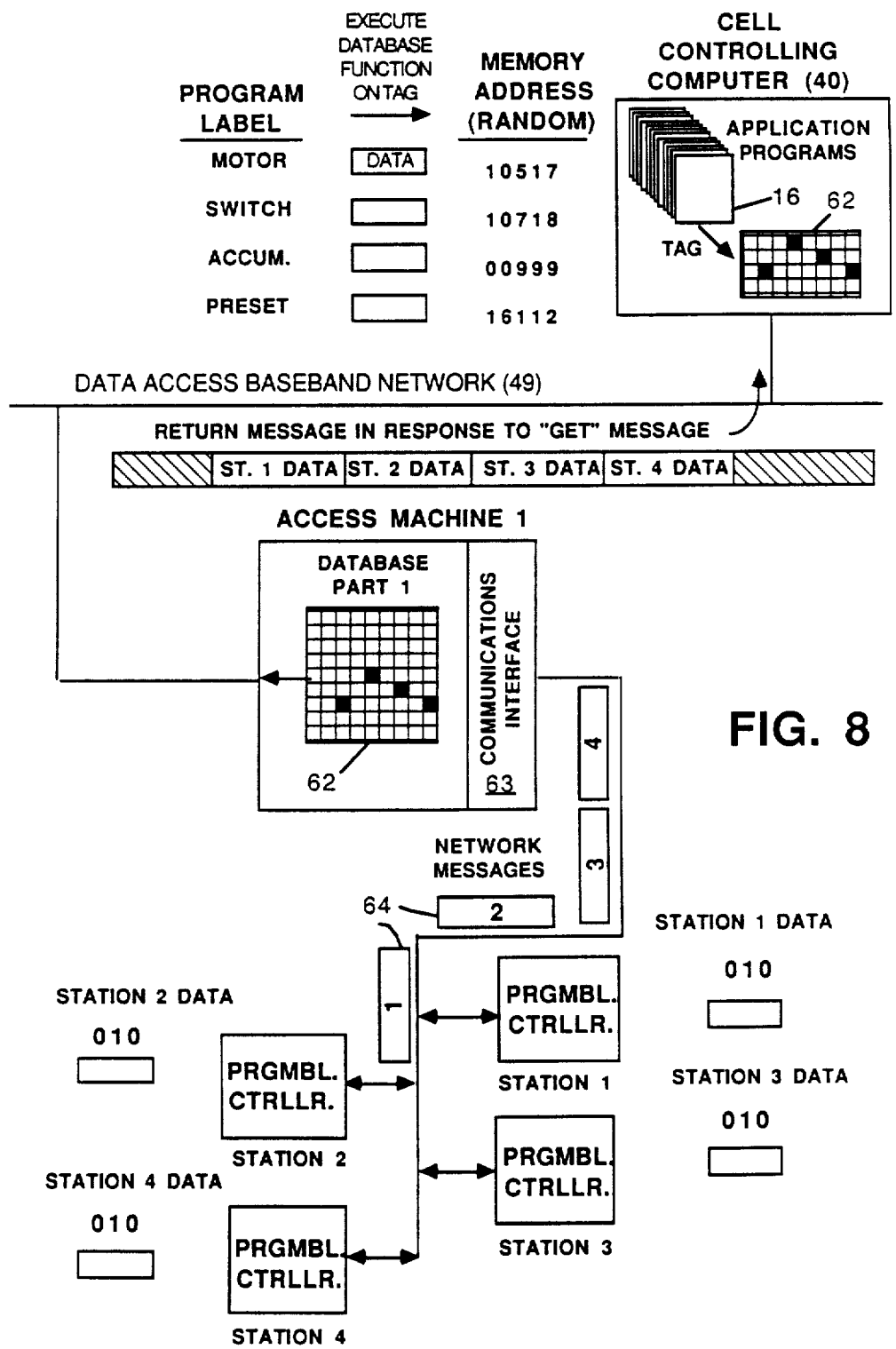
FIG. 8 is a data flow diagram showing the communication of another type of database-related information in a system that incorporates the access machine of FIG. 3.

The data dictionary for a system-level data record such as STATION would include the following atoms:
AMTAG—access machine tag name
ACK—acknowledgements
DIASTA—diagnostics status
HWPORT—network port
INSERV—in service status
RATE—scan class
STADDR—station network address
STYPE—station type
TAG—station tag name
TINSER—station's tag in/out service status
TYPE—type code
VALUE—status code The data dictionary for a data item record such as BIT would include the following atoms:
ACK—acknowledgements
CSTATE—collection status
CVADDR—command value address
CVALUE—command value
CVDBNC—command disagree debounce
INSERV—in service status
RATE—scan class
RMTFMT—remote data format
STATN—station tag name
TAG—tag name
TYPE—type code
VADDRS—data table address of VALUE
VALUE—collected value The data dictionary for a data item record such as INTEGER would include the following atoms:
ACK—acknowledgements
CSTATE—collection status
CVADDR—command or write value address
CVALUE—command or write value
INSERV—in service status
RATE—scan class
RMTFMT—remote data format, including 3-digit, 4-digit and 6-digit BCD and 16-bit signed and unsigned binary
RSTATN—station tag name
TAG—station tag name
TYPE—type code
VADDRS—data table address of VALUE atom
VALUE—collected or read value The data dictionary for a data item record such as TIMER would include the following atoms:
ACK—acknowledgements
CONVER—conversion factor—time base
CSTATE—collection status
CVADDR—command or write value address
CVALUE—command or write value
INSERV—in service status
PRESET—timer preset value
RATE—scan class
RMTFMT—remote data format
RSTATN—station tag name
TAG—station tag name
TIMED—timer done status
TIMING—timing bit
TYPE—type code
VADDRS—data table address of VALUE atom
VALUE—collected or read value FIGS. 7 and 8 illustrate the aspect of the invention in which the database 62 is present in ACCESS MACHINE 1 for communicating with station-level devices as they operate in a real-time factory environment. If changes are to be made in the database 62, they will occur while the access machine is in "on-line". The database 62 is also present in the cell controlling computer 40 to communicate with a human user through the work station 41.

There is an advantage in having two computers, the cell controlling computer 40 and ACCESS MACHINE 1, for performing these two different interface tasks. If the task of handling all user interface functions, such as video display and keyboard response, and the task of updating data from the stations were to be handled by the cell controlling computer 40 alone, the response of the computer system would be significantly slower. The access machine is thus like a partner to the cell controlling computer 40, and by dividing the station interface and user interface jobs between them, the response of the system can be significantly improved.

The creation of the partnership between the cell controlling computer 40 and ACCESS MACHINE 1 requires communication between them in carrying out certain database operations. These operations can be categorized and defined as follows:

Configuration Operations

ADD TAG/POINT—a record for a tagged data item as added to the database 62.

DELETE TAG/POINT—this operation removes a record for a tagged item from the database 62 and frees the tag name for reassignment to another data item.

READ—information for all atoms of one tagged data item is read from the database 62.

WRITE—information for all atoms of one tagged data item is written to the database 62.

LOCK—an operation which limits writing of data to a tagged data item in the database 62.

UNLOCK—an operation to remove the effects of the "lock" operation, it requires a "lock ID code".

CLEAR LOCKED POINT—an operation to remove the effects of the "lock" operation after a recovery from a system fault, it does not require the "lock ID code".

Data Access Operations

"GET" LIST OF ATOMS—in this operation, multiple atoms are read from multiple tagged items in the database of one access machine such as ACCESS MACHINE 1. These atoms may represent data at various stations on BASEBAND LAN 1 and BASEBAND LAN 2.

"PUT" LIST OF ATOMS—in this operation, multiple atoms are written to multiple tagged items in the database 62 of one access machine such as ACCESS MACHINE 1. These atoms may represent data at various stations on BASEBAND LAN 1 and BASEBAND LAN 2.

Utilities

BACKUP—in this operation a copy of the database 62 is made and the copy is stored first in the cell controlling computer 40, and more particularly in the hard disk memory 44.

RESTORE—in this operation the backup copy of the database 62 is recalled from the hard disk memory 44 of the cell controlling computer 40 and reloaded into the access machine.

Database configuration primarily relates to adding a tagged data item, deleting a tagged data item or changing the atoms in a tagged data item by reading or writing atom information. Certain "lock" operations are related to these basic configuration operations.

When a data item is locked, data can be read from the data item record through a "READ" operation, but there are limitations on writing data to the data item record through "WRITE" and "PUT" operations. All write operations can be locked out by locking the point for "read only" or the point can be locked for update only from the source performing the configuration. This source is given a "lock identification" name or number. If the cell controlling computer 40 is being restarted from a fault condition, it may be necessary to unlock a tagged data item and a "CLEAR LOCK" operation is provided for this situation.

The "GET" and "PUT" operations are the database access operations. These are given higher priority in utilization of the data access baseband network 49, and require less processing time than the "configuration" operations. While an individual "GET" or "PUT" involves one access machine, successive "GETS" or "PUTS" can be used to access data in two access machines such as ACCESS MACHINE 1 and ACCESS MACHINE 2.

Configuration operations such as ADD TAG/POINT, READ and WRITE, are commanded through the cell controlling computer 40 and involve the sending of a message to the access machine and the return of a message from the access machine to the cell controlling computer 40. These operations are transparent to the user. The user sees the screen information in FIGS. 4a and 4b, and in response to the calling up of certain screen displays or the entering of data, the database mangement program will execute the configuration operations such as ADD TAG/POINT, READ and WRITE. To carry out one of these functions, the database mangement program in the cell controlling computer 40 will operate on the version of the database 62 in the cell controlling computer 40 and will communicate messages to the access machine. The access machine is also programmed for management of its version of the database, including the carrying out of configuration operations.

FIG. 7 illustrates the "ADD TAG/POINT" operation. This operation provides an example of on-line configuration or reconfiguration of an access machine and its database 62.

In this example it shall be assumed that a photoelectric sensor is to be added to the conveyor system 24 and wired to a terminal on an input module such that its location in the memory of the programmable controller 11 is at bit "00" of a data word at address "011". As seen in FIG. 7, the data variables MOTOR, SWITCH, ACCUM_1 and PRESET_1 are not compiled to produce a consecutive series of memory addresses, but are instead assigned memory addresses by applying a hash function to their associated tags. Therefore, the data items MOTOR, SWITCH, ACCUM_1 and PRESET_1 are shown in FIG. 7 with random addresses in memory, and the new data item, which shall be referred to as EYE_1, will be assigned a memory location based on applying the hash function to its tag. It is not necessary to recompile the database or an application program to locate the new data in a particular memory address.

Figure 9:
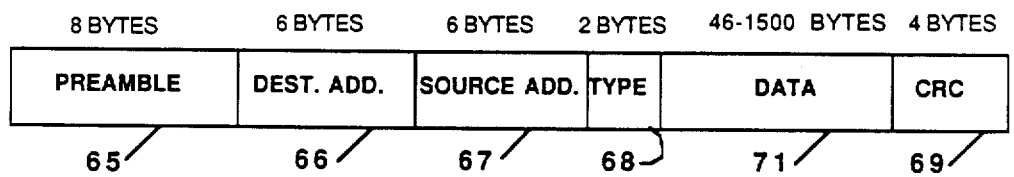
Figure 10:
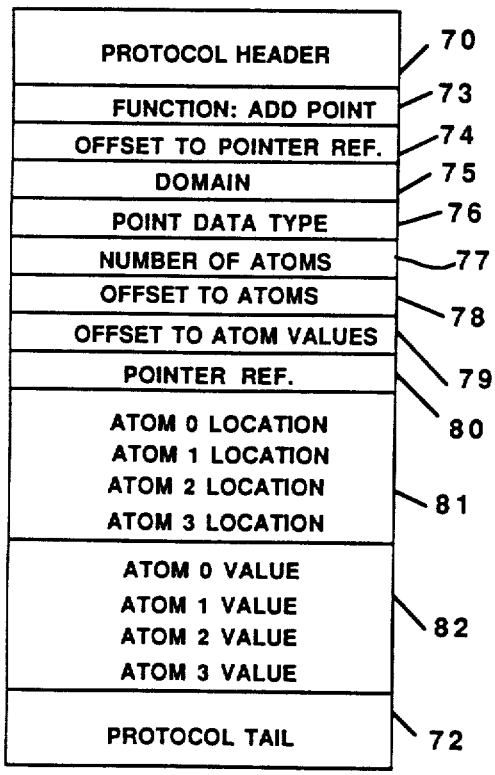

The protocol for messages sent through the data access baseband network 49 to ACCESS MACHINE 1 is seen generally in FIG. 9, and in more detail in FIG. 10. As seen in FIG. 9, database operations messages transmitted over the data access baseband network 49 include a preamble 65 of eight bytes, followed by a machine-level destination address 66 of six bytes, a machine-level source address 67 of six bytes, and a message type identifier 68 of two bytes. These items are followed by message data 71 which may range from 46 bytes up to 1500 bytes. At the tail end of messages transmitted over the data access baseband network 49 is a cyclic redundancy code (CRC) 69 of four bytes.

Referring to FIG. 10, the data in the "ADD TAG/POINT" message is seen in more detail. The first element of the message is a protcol header 70. This is followed by a function code 73 designating the message as the "ADD TAG/POINT" message. This is followed by a data element 74 containing an offset which is a number to be added to the memory address to locate a data point reference in the message, which is seen as the seventh data element 80 in the message in FIG. 10. The data point reference includes a tag name for the data item and an identifier of the access machine in which the data item resides.

Continuing in FIG. 10, the point reference offset is followed by a domain element 75 specifying the domain of the point reference, which may be limited to a level such as the cell level. This defines a tag as being unique within the domain of the cell. The domain element is followed by a element 76 specifying the data type such as BIT, INTEGER or TIMER. The data type element 76 is followed by a data element 77 specifying the number of atoms in the data item. This is followed by offset pointers 78, 79 to an array of atom addresses 81 and an array of atom values 82. Finally, the data is completed by a protocol tail 72.

Initial values are required for some of the atoms, and default values are provided if no initial value is specified. An initial value is not required for other atoms, such as the VALUE atom, for which data will be collected from the station.

As seen in FIG. 7, when the EYE_1 data item is added to the version of the database 62 in cell controlling computer 40, the "ADD POINT" message is transmitted to ACCESS MACHINE 1. This message includes the tag name which is necessary for storing the information in the database 62. The message also effectively includes the location of the data item at a remote station in the form of the RSTATN atom and the VADDRS atom which are defined in the data directory for a BIT type data item such as EYE_1. The station location information is sent only during the on-line configuration change and is not necessary for database access operations that will be performed later.

Figure 11:
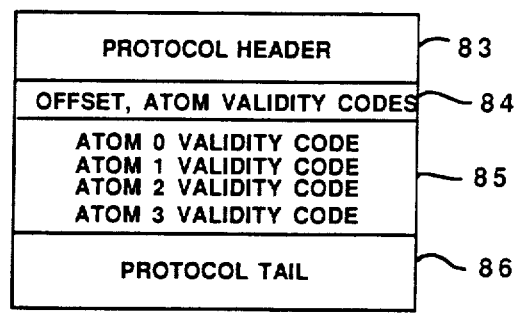

To confirm the receipt and implementation of the message, ACCESS MACHINE 1 will return a message as mapped in FIG. 11. This message includes a return protocol header 83, an array of atom validity codes 85, a data element 84 with an offset pointer to the beginning of the array 85, and a return protocol tail 86.

Once a point is configured, it can begin to collect and update its "live" atoms in response to conditions at the programmable controller 11 at Station 2. On the downstream side of the database 62 in FIG. 7, a communications hardware and software interface 63 will utilize the address information in the data item and station records to communicate with location "011" at the Station 2 programmable controller 11 using network messages 64 of the type seen in FIG. 1.

Once a data item is configured it will be retrievable from ACCESS MACHINE 1 by its tag name rather than by its station-level address. And, when a data item is retrievable by its tag name, it can be retrieved with data items from other stations more quickly, in a single message, and without carrying overhead in the form of station-level addresses.

FIG. 8 illustrates the retrieval of data from four stations. Four network messages 64 are necessary to obtain data from location "010" in four programmable controllers at Stations 1–4 connected to a single local network. This data is collected and stored in the database at four locations determined by configuration operations that added these items to the database 62. Typically, the command to retrieve or "GET" a plurality of data items from the database 62 is generated by an applications program 16 on the cell controlling computer 40, which calls a routine for executing the "GET" operation.

The routine for executing the "GET" operation will generate the "GET" message seen in FIG. 12. This message will include a protocol header 90, a data element 91 specifying the "GET" function, a data element 92 specifying the number of atoms to be retrieved, a data element 93 specifying the access machine to be addressed a data element 94 providing an offset pointer to the beginning of an array 95 of atom references, and following the array 95, a protocol tail 96. Each atom reference includes an atom name and the tag name associated with the data item to which the atom pertains.

The "GET" message will be received by ACCESS MACHINE 1, and in response ACCESS MACHINE 1, will retrieve the data items from the database using their tag names and will assemble and generate the "GET" return message seen in FIGS. 8 and 13. The "GET" return message will include a protocol header 100, an offset pointer 101 to an array of atom validity codes, an offset pointer 102 to an array of atom directory elements and an offset pointer 103 to an array of atom values. This is followed by the array 104 of atom validity codes, the array 105 of atom directory elements, the array of atom values 106 and protocol tail 107. The atom directory elements each include the atom data type, the atom size in bytes and an offset in bytes from the start of the atom value buffer to a specific atom value.

Returning to FIG. 8, the array of atom values in this instance includes the values of data at locations "010" of each of the Stations 1-4. When the "GET" return message is received by the cell controlling computer 40, the the live atoms are updated in its version of the database 62 and are displayed or used in some other manner dictated by the application program 16 which called for their retrieval.

It should now be apparent how the "GET" operation allows access to data in the database 62 on the basis of atom references, and independent of station location. The data is associated on some other basis than station location and may originate at a variety of stations. Although four stations are connected to ACCESS MACHINE 1 through a single network, the data may be collected from stations connected to the ACCESS MACHINE 1 through different local area networks.

If the "GET" operation is something like a database read access operation, then a "PUT" operation is something like a database write operation. The data necessary for execution of a "PUT" operation is seen in the map of the "PUT" message and its return message in FIGS. 14 and 15, respectively.

A "PUT" message contains a plurality of atoms which may be related to tagged data items at different stations. As seen in FIG. 14, the "PUT" message includes a protocol header 110, a "PUT" function data element 111, a number of atoms data element 112, an access machine reference element (the access machine tag) 113, an offset pointer 114 to an array of atom references, an offset pointer 115 to an array of atom directory elements, an offset pointer 116 to an array of atom values, the array of atom references 117, the array of atom directory elements 118, which contain data as explained for the atom directory elements for the "GET" return message, the array of atom values 119 and a protocol tail 120 similar to the protocol tails for the other messages.

A "PUT" message is sent from the cell controlling computer 40 to an access machine and, in response, a "PUT" return message is sent from the access machine to the cell controlling computer 40. The data in a "PUT" return message is mapped in FIG. 15 and includes, a protocol header 130, an offset pointer 131 to an array of atom validity codes, the array of atom validity codes 132 and a protocol tail 133.

Figure 16:
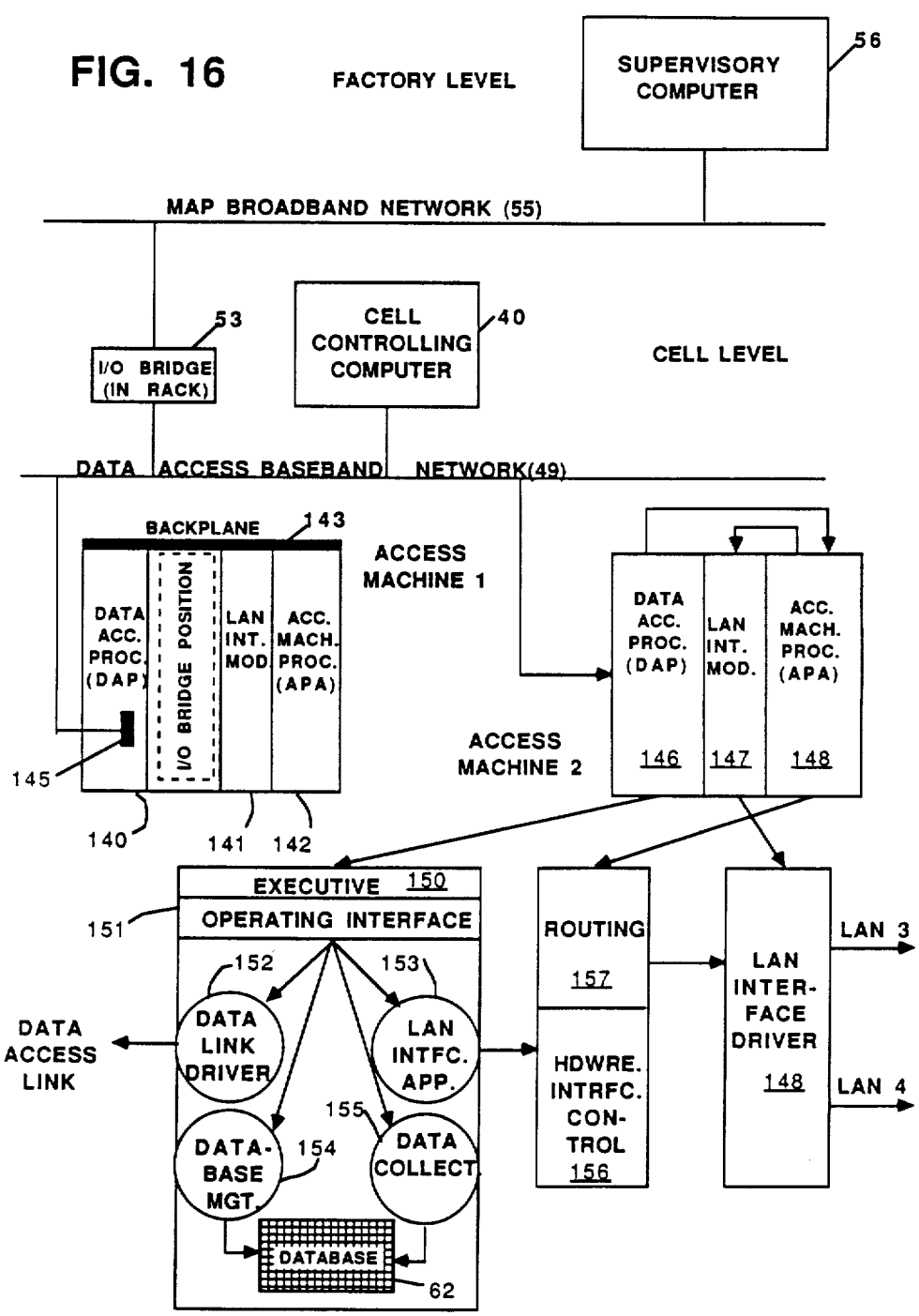
FIG. 16 is a hardware-firmware schematic showing the architecture of the access machine of FIG. 3.

FIG. 16 shows the details of the hardware and software which are incorporated in the ACCESS MACHINE 1 and ACCESS MACHINE 2. ACCESS MACHINE 1 has four modules which are supported in an equipment rack (not shown). The equipment rack inclues a backplane motherboard 143 with electrical connectors that receive mating connectors on three modules, a data access processor (DAP) module 140, a local area network (LAN) interface module 141 and an access machine processor (APA) module 142. The other module in the rack is the I/O bridge module 53, which is supported in the rack in the position outlined in phantom, but which is not connected to the backplane 143. The I/O bridge module 53 is connected through one connector on its front side to the MAP broadband network 55 and is connected through another connector on its front side to the data access baseband network 49. The DAP module 140 also has a connector 145 on its front side that connects to the data access baseband network 49.

ACCESS MACHINE 2 also has a DAP module 146, an LAN interface module 147 and an APA module 148 which are identical to th modules 140-142 in ACCESS MACHINE 1. A second I/O bridge module 53 is not needed for ACCESS MACHINE 2.

FIG. 16 also shows the organization of th program firmware and software in the modules 146-148 of ACCESS MACHINE 2, and this is the same for ACCESS MACHINE 1. The DAP module 146 includes a microelectronic CPU from the 68000 Series available from Motorola, Inc. of Phoenix, Ariz. and Austin, Tex. This component is the central controlling element or brain of the DAP module 146. The highest level program component is a multi-tasking executive program 150 and a number of these are available from commercial sources for the various models of microelectronic CPU's. The particular one used in this embodiment is available under the trade designation C-Executive from JMI Software Consultants, Spring House, Pa.

The executive program 150 is interfaced to four other program modules 152-155 through an operating interface module 151. The first two modules 152, 153 perform communication tasks while the second two modules 154, 155 execute tasks for collecting, managing and accessing data in the database 62.

The data link driver module 152 provides instructions for handling communication of messages over the data access baseband network 49. The LAN interface application module 153 communicates message information that is transmitted over the BASEBAND LAN 1-4 networks, but first the information is transmitted through the APA module 148 and the LAN interface module 147. The BASEBAND LAN 3-4 networks connect to the LAN interface module 147. The APA hardware module 148 includes firware in the form of a hardware interface control module 156 and a routing module 157 for routing messages to the the two networks connected to the LAN interface module 147. The LAN interface module 147 is organized along two parallel data paths, one for each BASEBAND LAN, and includes LAN interface driver firmware 148.

In the access machines, the processing of the "ADD POINT/TAG", "GET" and "PUT" messages and functions discussed above is executed through the database management software module 154. The operation of the data collection software module 155 is better understood by examining FIGS. 17 and 18, which show how data received in station-related messages is reorganized for inclusion in the database 62 in station-independent manner.

Figure 17:
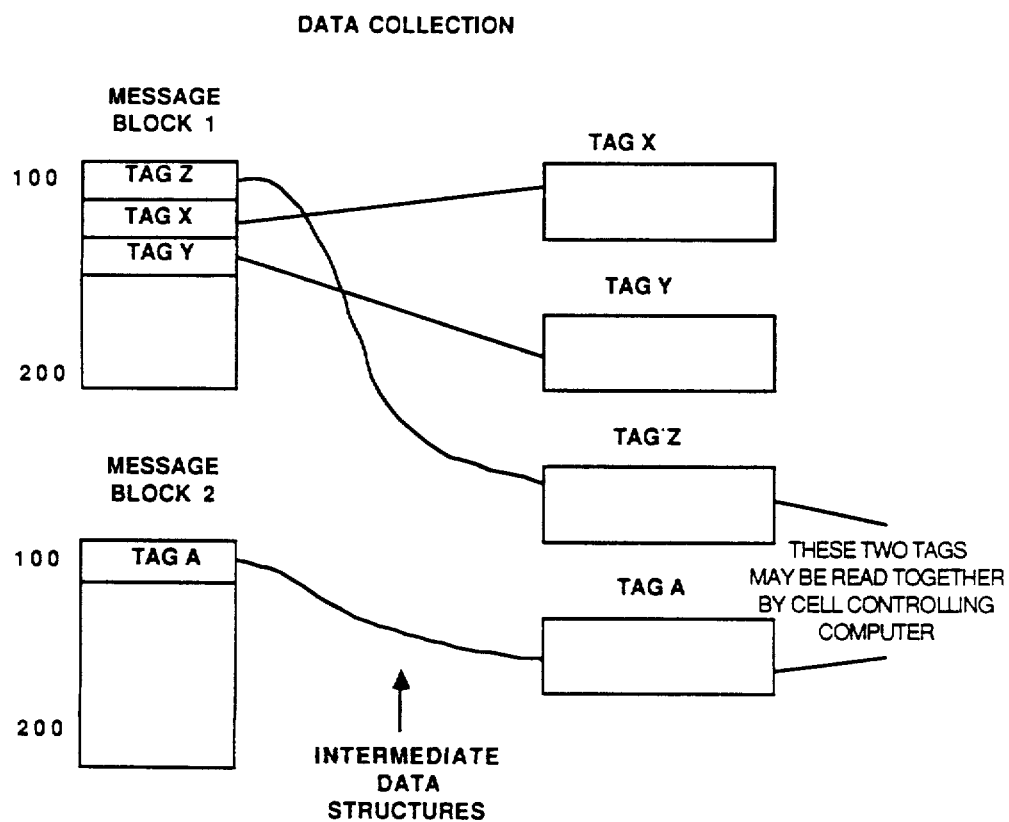
FIGS. 17 and 18 are block diagrams illustrating the operation of data collection software in the access machine of FIG. 3.

FIG. 17 shows two blocks of message data that have been received over the BASEBAND LAN's. Each message on the BASEBAND LAN's can include up to 256 total bytes of data and up to 240 bytes of tag data.

It shall be assumed for this example that Block 1 has been received from Station 1 and includes one hundred bytes of tag data. Included in Message Block 1 are tag data for TAG Z, TAG Y and TAG X. It shall further be assumed that Message Block 2 has been received from Station 2 and includes another one hundred bytes of tag data including data associated with TAG A.

FIG. 17 shows how the atoms with TAG X, TAG Y, TAG Z and TAG A are reorganized in the database 62 so that TAG Z and TAG A can be transmitted together to the cell controlling computer 40. This is accomplished by configuring certain intermediate data structures that are utilized by the data collection software, and these structures are seen in FIG. 18.

Figure 18:
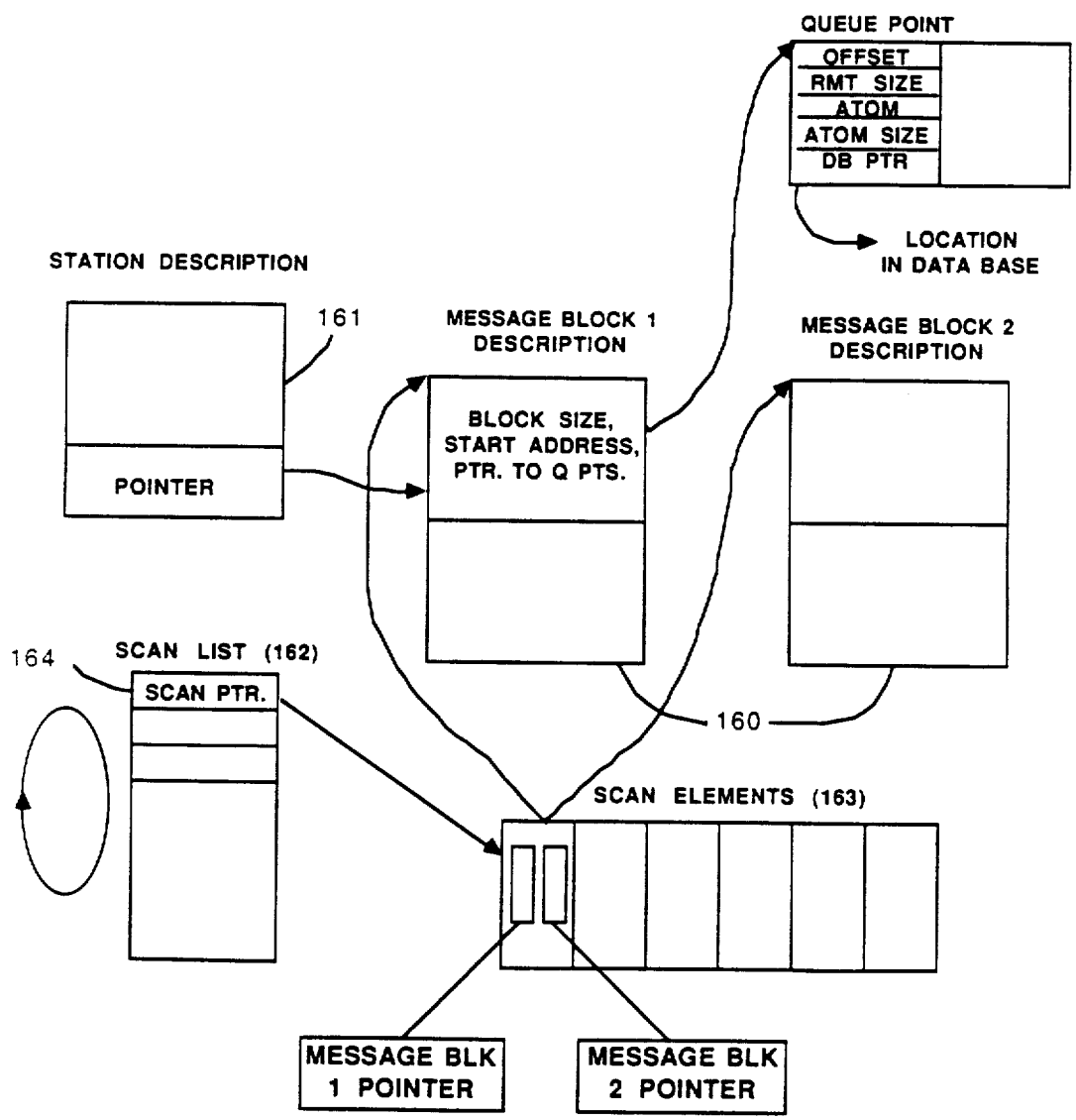

Referring to FIG. 18, during configuration operations, the access machine determines which stations are connected to it and how many atoms in the database 62 must be communicated to each respective station. Depending on this number, it sets up one or more message block description data structures 160 per station. Each of these data structures 160 defines a block of data to be transmitted to or from the station over the BASEBAND LAN's. Each message block description data structure 160 includes reference data specifying the block size, a starting address in memory and pointers from the atoms in the message block to queue points.

For example, it shall be assumed the message block descriptions in FIG. 18 relate to data from Station 1 and Station 2, respectively, and that there are two more message block descriptions for Station 1. Each message block description is cross-referenced to a station description record 161 which is based on the station record downloaded from the cell controlling computer 40 to ACCESS MACHINE 1.

The message block descriptions are used to size blocks of data according to the capabilities of the BASEBAND LAN's. These networks can communicate a number of request messages to the stations per second, and can receive a smaller number of data reply messages per second. In order to maximize the data communication rate from the stations and to minimize scan times for updating data, two further data structures, referred to as a SCAN LIST 162 and SCAN ELEMENTS 163 are used.

The SCAN LISt 162 contains a list of SCAN POINTERS 164 based on the scan class assigned to the atoms in a particular message block description. The scan class may specify, for example, that the message block of data should be collected once every two seconds. It shall also be assumed for the example that ACCESS MACHINE 1 can receive two messages in that time period. In that event, a SCAN POINTER 164 will point to a SCAN ELEMENT 163 having pointers to the two message blocks 160. When the CPU in ACCESS MACHINE 1 reaches the SCAN POINTER 164 and is referred to the SCAN ELEMENT 163, it will cause transmission, in one message timeframe, of message requests to Statins 1 and 2 to request Message Block 1 and Message Block 2 as reply messages. These reply messages will be transmitted to ACCESS MACHINE 1 in two later message times frames, but within the time limit necessary to meet the scan class update time.

By transmitting a number of requests in one message time frame to different stations, the stations are allowed to work simultaneously in preparing return messages. This provides a faster communication for messages and data than would be the case if only one message request could be transmitted in each message timeframe.

The links between the message block descriptions and the atom locations in the database 62 ae the queue points. Each queue point includes a pointer to a tag location in the database 62 which includes the particular atom. Other information in the queue point includes an offset pointer to the database pointer, the size of the atom at the remote station (RMT SIZE), the name of the atom (ATOM) and the size of the atom in the database 62 (ATOM SIZE). The queue points are set up when the database 62 is downloaded and when new data items are added to the database 62.

From this it should be apparent how the database 62 is interfaced on its downstream side using station-oriented messages and on its upstream side using database messaging and access operations.

The following is a description of the various circuit modules which make up the access machines in FIG. 16.

Data Access Processor Module (DAP)

Viewing ACCESS MACHINe 2 in FIG. 16 as a computer, the DAP module 146 is a peripheral processor module for handling communication over the data access baseband network 49, while the CPU of the access machine is the access machine processor (APA) module 148. The LAN interface module 147 is a second peripheral processor module. It may be desirable in other embodiments to combine the modules 146 and 148 into a single CPU module for controlling the LAN interface module 147.

Figure 19:
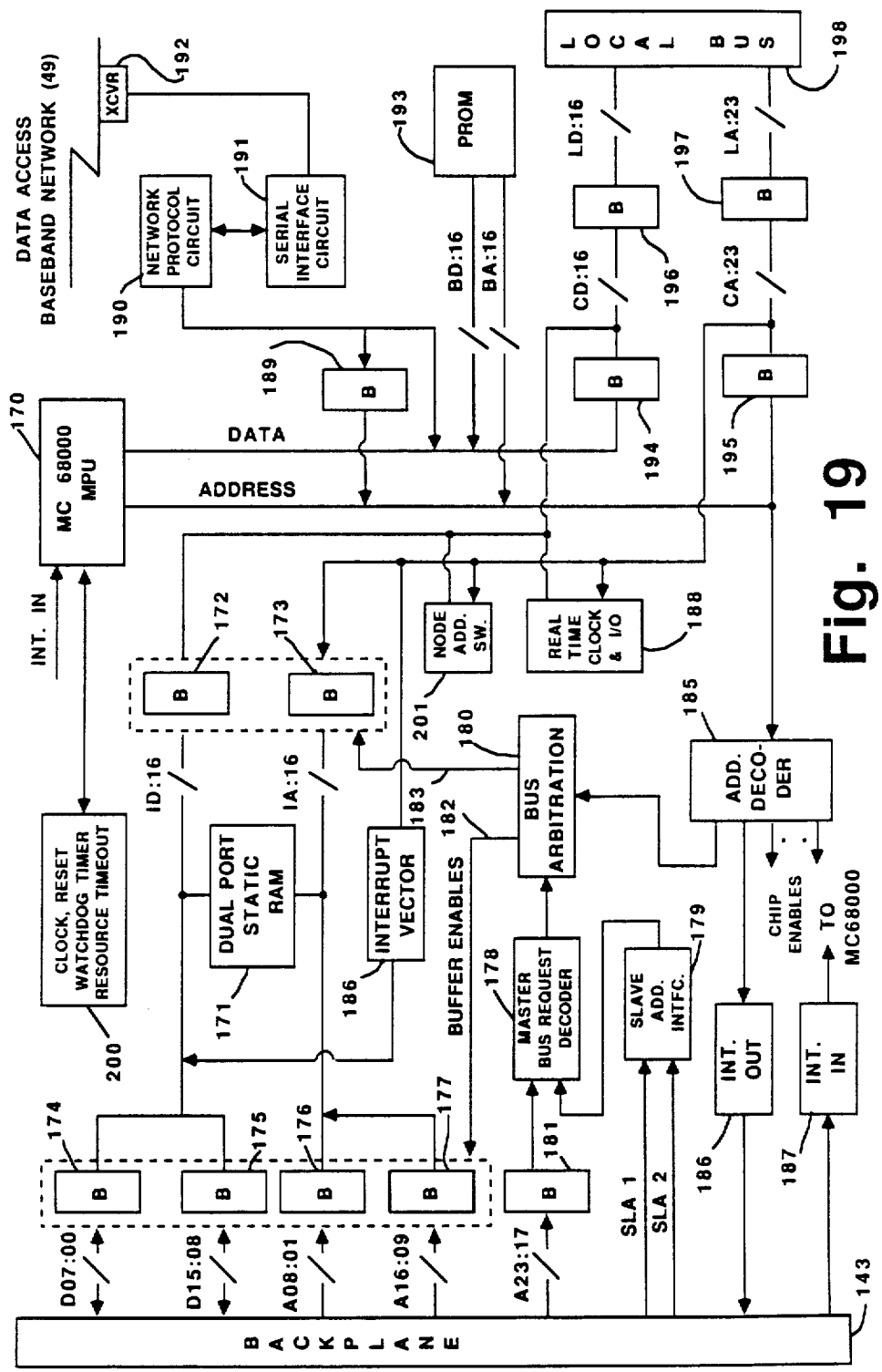
FIG. 19 is a schematic diagram of a processor board in the data access link processor module seen in FIG. 16.
Figure 20:
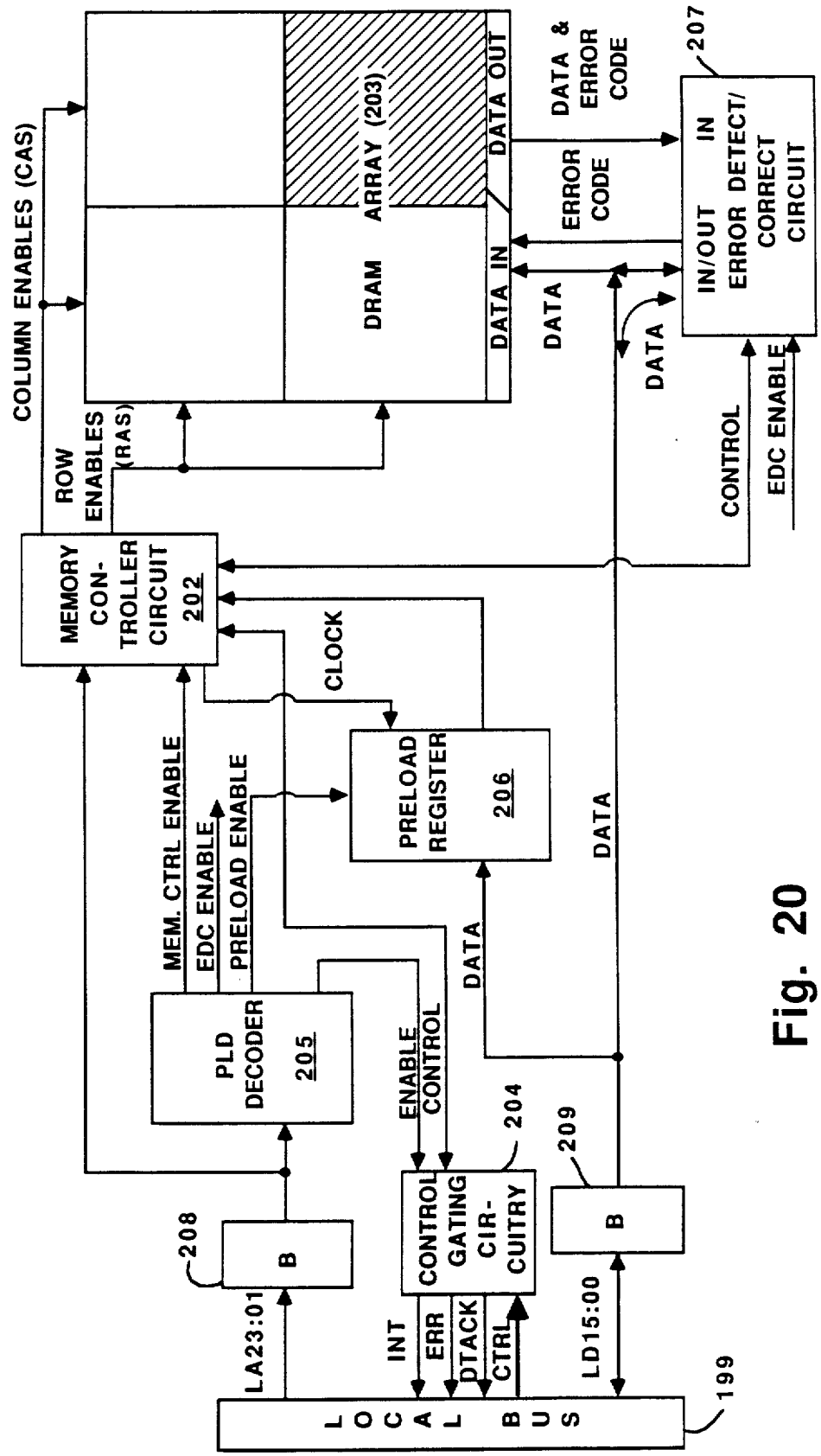
FIG. 20 is a schematic diagram of a memory board in the data access link processor module seen in FIG. 16.

The details of the data access processor (DAP) module 146 are illustrated in FIGS. 19 and 20. The DAP module 146 comprises a data access processor (DAP) board illustrated in FIG. 19 and a data access memory board illustrated in FIG. 20. The data access memory board contains a 2-Megabyte dynamic RAM for storing the database 62 and the program modules 150–155 of FIG. 16.

Because the DAP module 146 is a peripheral module in the context of the access machine unit, it is "slaved" to the mastership of the access machine processor (APA) module 148, which means that the DAP module 146 must generate an interrupt signal to the APA module 148 when it wants to communicate, and then the APA module 148 initiates and controls the communication.

The DAP board is directed by a microelectronic processor unit (MPU), which in this embodiment is an MC 68000 MPU 170 available from Motorola Semiconductors of Austin, Tex. This is the brain of the DAP module 146. The MC 68000 is manufactured in a 64-pin package. It has 32-bit data registers and internal data paths. The 64 input/output terminals include terminals for twenty-three bits of address information (A1–A23) and sixteen bits of data (D0–D15). The MC 68000 does not provide an A0 address line. Instead it uses upper data strobe (UDS) and lower data strobe (LDS) signals to control byte transfers. A signal on the upper data strobe (UDS) signals that a byte of data is being trnsferred on lines D8–D15 of the data bus. A signal on the lower data strobe (LDS) signals that a byte of data is being transferred on lines D0–D7 of the data bus.

The control bus of the 68000 is referred to as asynchronous. When a bus cycle is initiated to transfer data to or from the MPU, the bus cycle is not completed until a signal is returned from external circuitry. The control signals that control addressing and data transfers are address strobe (abbreviated AS in 68000 literature from Motorola), read/write (R/W), and data transfer acknowledge (DTACK).

The MPU 170 must signal external circuitry when an address is available, and whether a read or write operation is to take place. It does this with the AS and R/W signals respectively. At the instant when a valid address is present on the address bus, the 68000 generates a logic "0" on the address strobe line to signal memory or I/O devices that an address is present. A logic "1" on the read/write line signals a read operation while a logic "0" signal on the read/write line signals a write operation.

The data transfer acknowledge (DTACK) signal is a signal to the MPU 170 that indicates the status of the bus cycle. During a read or input cycle, a logic "0" returned to the MPU 170 at its DTACK input signals that valid data is on the data bus. The MPU will then read the data from the data bus and latch it in an internal register. During a write cycle, a signal on the DTACK line informs the MPU 170 that the data had been received in memory or by the peripheral device. Therefore each memory or other circuit on the DAP module 146 must be associated with a DTACK generator circuit that will return the DTACK signal at the appropriate time in the bus cycle.

The MPU 170 are uses other control signals including: (1) system control signals such as bus error (BERR), halt (HALT) and reset (RESET), (2) processor function code signals FC0–FC2, (3) interrupt control signals IPL0–IPL2, (4) bus arbitration signals such as bus request (BR), bus grant (BG) and bus grant acknowledge (BGACK) and (5) synchronous bus control signals such as enable (E), valid peripheral address (VPA) and valid memory address (VMA). Many of these signals are represented in the literature as logic low or negative state signals, however, this notation has been omitted here. Some of the control signals will be discussed herein, however, for a full description of these signals and for the architecture, operation and programming of this MPU and typical circuits used to augment and implement its functions, reference is made to the commercial literature for the 68000 MPU available from Motorola Semiconductors of Austin, Tex.

The 68000 MPU has a 16-Megabyte address space which in this embodiment is assigned as seen in the following Table 1.

TABLE 1

| Address Range | 68000 Address Space Function |
|---|---|
| 000000–01FFFF | PROM Addresses |
| 020000–15FFFF | Not used |

TABLE 1-continued

| Address Range | 68000 Address Space Function |
|---|---|
| 160000–17FFFF | Dual port RAM Addresses |
| 18U000–1FFFFF | Not used |
| 200000–3FFFFF | 2 Mb Dynamic RAM |
| 400000–FFFFFF | Not used |
| FF0000–FFFFFF | On-board memory mapped I/O space |

The MPU 170 and a second MPU on the APA module 148 communicate through the backplane 143 and through a dual port static RAM (random access memory) 171. The MPU 170 is connected through control lines to the the dual port RM 171 to access it within a 150-nanosecond time period. Sixteen bits of address and sixteen bits of data can be communicated from the MPU 170 to the dual port RAM 171 through buffer (B) circuits 172, 173 and sixteen lines each of an intermediate address bus (IA:16) and an intermediate data bus (ID:16), respectively. Data can also be read by the MPU from the dual port RAM 171 through the intermediate data bus (ID:16) when the buffer (B) circuits 172, 173 are enabled. The intermediate address bus (IA:16) and the intermediate data bus ID:16) also connect through buffer (B) circuits 174–177 to sixteen address lines (lines A16:09 and lines A08:01) and sixteen data bus lines (lines D15:08 and lines D07:00) on the backplane 143.

When the APA module 148 is to communicate with the dual port RAM 171, it will address the DAP module 146 through lines A23:17, which are connected to a master bus request decoder circuit 178. A slot address for the DAP module 146 is set via wiring on the backplane which communicates logic signals on lines SLA 1 and SLA 2 to a slave address interface circuit 179. This circuit 179 communicates an output logic signal to the master bus request decoder circuit 178 which is compared with an address signal received through address lines A23:17 and buffers 181. If there is a match, the master bus request decoder circuit 178 generates a request signal to a bus arbitration circuit 180 which controls the enabling of the buffer (B) circuits 172–177 through buffer enable lines 182–183. The bus arbitration circuit 180 will grant the request and enable the backplane buffers 174–177, so that the APA module 148 can access the dual port RAM 171.

When the MPU 170 communicates with the dual port RAM 171, it generates an address on its address bus 184 to an address decoder 185. A signal from the decoder 185 is transmitted to the bus arbitration circuit 180, which at the appropriate time will enable the buffers 172, 173. The address decoder 185 also decodes signals to enable other circuits on the the DAP processor board.

The DAP board initiates communication with the APA processor module 148 by generating an interrupt signal. To start an interrupt sequence the MPU 170 generates an address at which it "sees" the APA processor module 148. This address is received by decoder 185 and is decoded to generate a signal to an interrupt output circuit 186 that generates the interrupt signal on the backplane 143. Besides generating the interrupt signal, the MPU 170 must also generate a vector, which is a number that will inform the APA processor module 148 of which of several devices is sending the interrupt signal. An interrupt vector latch 186 is connected to the MPU data bus to receive this number and to communicate it to the backplane 143. The MPU on the APA processor module 148 will read this number during the interrupt sequence to recognize the interrupt as coming from the DAP board and to execute a corresponding interrupt routine of instructions to carry out communication with the dual port RAM 171.

The MPU 170 on the DAP board also receives interrupt signals from other circuits on the DAP board and from the APA processor module 148. The MPU 170 receives these signals on three interrupt lines represented by an INT. IN bus in FIG. 19. These lines carry binary-coded signals to establish eight interrupt signals of different priority. An interrupt input circuit 187 which receives the interrupt signal through the backplane 143 is shown in FIG. 19. Other interrupt lines from the other circuits have not been shown to avoid undue complexity in the figure, but it should be understood that these are included. The DAP board includes input and output registers in a real time clock and I/O circuitry section represented by block 188 in FIG. 19. When other circuits on the DAP processor board generate interrupt signals, they will either generate a "vector" that will be read by the MPU 170 through an input register in the circuitry 188 or an autovector circuit will be utilized. Circuits for executing the autovector function are discussed in the literature for the MC 68000 MPU.

The following Table 2 summarizes of the interrupt sources and priority levels of interrupts generated to the MPU 170.

TABLE 2

| Priority of Interrupts | |
|---|---|
| Priority Level | Interrupt Source |
| 7 | AC Power Fail |
| 7 | Watchdog Timer |
| 7 | RAM Error |
| 7 | Resource Timeout |
| 7 | Software Abort |
| 6 | Network Service Interrupt |
| 5 | Receiver Interrupt |
| 4 | Transmitter Interrupt |
| 3 | Software Timer Interrupt |
| 2 | Master Interrupt |
| 1 | Utility Interrupt |

From this it will be seen that the interrupt signal from the "master", which is the APA processor module 148 is given priority "2", which is lower than certain other time-sensitive interrupts that must be serviced first. These other interrupts will be discussed below in connection with the other circuits on the board.

One of the primary functions of the DAP module 146 is to interface with the data access baseband network 49. To carry out this function the MPU 170 has its address and data buses connected through buffers 189 to a network protocol circuit 190. Preferably this circuit is a Model 7990 LANCE circuit available from American Micro Devices. This circuit can manage communication over the data access baseband network 49 at a rate or 10 Megabits/second. It contains error-checking circuitry and performs functions related to the Data Link Layer, which is Layer 2 of the Open Systems Interconnection (OSI) model. The circuit also assembles and disassembles message packets in the protocol mapped in FIG. 9.

The network protocol circuit 190 includes a DMA (direct memory access) controller which can manage data transfers between the communication channel and the dual port RAM 171. The MPU 170 and the network protocol circuit 190 arbitrate for access to the dual port RAM 171 and the data access memory board using certain control signals such as BR L, BG L and BGACK L, which are specified in the literature of the MC 68000. The network protocol circuit 190 is connected to these lines to generate a bus request through a FPLA (field programmable logic array) circuit which is included in the circuitry represented by address decoder block 185. This bus request signal is transmitted to the bus arbitration circuit 180. The network protocol circuit 190 can then exchange data with the dual port RAM 171 through the MPU data bus without the control of the MPU.

The network protocol circuit 190 is interfaced to the data access baseband network 49 through a serial interface adapter circuit 191. Preferably this circuit is a Model 7991A Serial Interface Adapter circuit available from American Micro Devices. This circuit provides functions related to the Physical Layer, which is Layer 1 of the Open Systems Interconnection (OSI) model. In general, this circuit also performs in accordance with IEEE Std. 802.3. In particular, this circuit performs Manchester encoding and decoding of the serial bit stream and contains the line drivers and line receivers. The outputs of the line drivers and line receivers are coupled to pulse transformers for electrical isolation from the baseband network 49.

The serial interface adapter circuit 191 is connected to the data access baseband network through a transceiver 192 of a known type for networks operating according to IEEE Std. 802.3. It provides collision detection, jabber control and line driving and receiving functions necessary for transmitting and receiving signals over the data access baseband network 49.

The data access processor board also includes at least 33K×16 bits of programmable read-only memory (PROM) 193. The PROM 193 stores program instructions in object code for initializing the module and receiving the database 62 and the other program blocks 150–155, which are reloaded into a 2-Megabyte dynamic RAM memory on the data access memory board each time the system is restarted. The PROM 193 is addressed by the MPU 170 through a "B" branch of the MPU address bus with sixteen lines (BA:16). Program data is read from the PROM 193 by the MPU 170 through a "B" branch of the MPU data bus also having sixteen lines (BD:16).

The MPU 170 is connected to the 2-Megabyte dynamic RAM memory on the data access memory board through two sets of buffer circuits which define two additional sets of buses. The MPU address and data buses are coupled through a first set of buffer circuits 194, 195 to a "C" branch of the MPU address bus with twenty-three lines (CA:23) and to a "C" branch of the MPU data bus with sixteen lines (CD:16). These bus sections are, in turn, coupled through a second set of buffer circuits 196, 197 to a local address bus with twenty-three lines (LA:23) and a local data bus with sixteen lines (LD:16). The local buses extend through connectors 198 in FIG. 19 and 199 in FIG. 20 to provide communication between the two circuit boards in the DAP module 146.

The DAP board includes a number of miscellaneous circuits, and represented by block 200 in FIG. 19. A clock circuit provides the basic time base signal of 10 MHz. A reset circuit of a well-known type provides a reset signal to the MPU 170 at power up or to restart operation. A watchdog timer circuit detects processor failures by timing out unless the MPU 170 restarts it within a specified time. A reource timer is provided to detect failures in communicating off the DAP processor board, such as when the MPU 170 accesses the data access memory board.

A node address switch 201 is provided on the DAP board to select a station address for the access machine. This address is part of the 48-bit address used by the network protocol circuit 190.

The real time clock and I/O port circuit 188 includes registers for reading status data and writing control bits to the various circuits that have been described. The I/O register circuitry is provided by 74LS or 74ALS circuits available from Texas Instruments, Inc. and other sources. Some of these status and control bits and their addresses are summarized as following Table 3.

TABLE 3

Summary of Read and Write Registers

| | Bit No. | Function |
|---|---|---|
| Write Register | | |
| FF0000 | 0 | Enables all interrupts to MPU |
| FF0002 | 0 | Activates software abort interrupt |
| FF0004 | 0 | Generates receiver interrupt (Level 5) |
| FF0006 | 0 | Generatss Transm. interrupt (Level 4) |
| FF008 | 0 | Generates utility interrupt |
| FF000A | 0 | Hardware reset |
| FF000C | 0 | Watchdog timer control, first bit |
| FF000E | 0 | Watchdog timer control, second bit |
| Read Register | | |
| FF0080 | 1 | AC Power Fail interrupt (Level 7) |
| FF0080 | 1 | Watchdog timeout interrupt (Level 7) |
| FF0080 | 2 | RAM error interrupt (Level 7) |
| FF0080 | 3 | Resource timeout interrupt (Level 7) |
| FF0080 | 4 | Software abort interrupt (Level 7) |
| FF0080 | 5 | Set with interrupt vector |
| FF0080 | 6 | Correctable error |
| FF0080 | 7 | Not used |
| Write Register | | |
| FF0100 | 5 | Resets interrupt to APA (Level 2) |
| FF0100 | 6 | Resets resource timeout (Level 7) |
| FF0100 | 7 | Generates sys. fail signal |
| Read Register | | |
| FF0180 | 0-7 | Node switch address |
| Register | | |
| FF0200 | | Interrupt vector latch |
| FF0280 | | Data register in network protocol circuit |
| FF0282 | | Address register in network protocol circuit |
| FF0300-FF037E | | Real time clock registers |
| FF1000 | | Data access memory board, EDC control register |

The real time clock portion of the circuit 188 is preferably an MC 146818 timing circuit available from Motorola. This circuit provides three maskable interrupts including a time-of-day alarm, a time base signal programmable in a range from 30.5 microseconds to 500 milliseconds and an end-of-clock update cycle.

Referring to FIG. 20, the data access memory board is the second board in the two-board DAP module 146. The two boards communicate through the local bus. The memory is provided as an array 203 of dynamic random access memory (DRAM) circuits, each circuit providing 256 kilobits (256K) of storage capacity. The number of memory chips in the array is eighty-eight. The memory is arranged to store words of 22 bits, 16 bits of data and a six-bit error correction code. Twenty-two of the memory circuits are connected in parallel to store 256K data words of sixteen bits each or 512K bytes. Thus, there are four sections of memory for storing 256K data words each, and if these 16-bit words are halves to eight-bit words (bytes) there would be eight sections of memory in the array. In total, the memory provides 1K megawords or 2 megabytes (2 Mb) of storage capacity.

A memory controller circuit 202 is connected to address sections of the memory through column enable (CAS) lines and row enable (RAS) lines. For illustration purposes, it shall be assumed that the sections of memory are addressed as a 2×2 matrix. As shown, when the second column enable line and the second row enable line are active, an individual section of the array is selected.

The local bus includes the twenty-three address lines (LA 23:01) and sixteen data lines (LD15:00) originating on the data access processor board. The address signals on lines LA23:01 are received through buffer (B) circuits 208, 209 such as 74ALS244 or 74LS244 circuits available from Texas Instruments, Inc. and other sources. These circuits are also used to receive signals on lines LD15:1 of the data bus. Also included in the buffer (B) circuits 209 for the data bus are 74LS373 circuits for driving the data back to the data access processor board. These circuits are also available from Texas Instruments, Inc. and other sources.

Also included in the local bus are the control lines in the following Table 4, many of which are specified for and originate at the MC 68000 MPU 170.

TABLE 4

| | Definition of Lines in Local Bus |
|---|---|
| MNEMONIC | NAME - Definition |
| LRST L | LOCAL RESET - Open collector signal from the data access processor board; a logic low signal on this line will reset the data access memory board. |
| LAS L | LOCAL ADDRESS STROBE - Totem-pole signal from the the data access processor board indicating that valid address is on the address bus. |
| LUDS L | LOCAL UPPER DATA STROBE - Totem-pole signal from data access processor board indicating that a data transfer will occur on data bus lines LD8-LD15. |
| LLDS L | LOCAL LOWER DATA STROBE - Totem-pole signal from data access processor board indicating that a data transfer will occur on data bus lines LD0-LD7. |
| LR/W L | LOCAL READ/WRITE - Totem-pole signal from the data access processor board indicating that either a read or a write signal in progress. A logic high signal indicates a read operation while a logic low indicates a write operation. |
| LDTACK L | LOCAL DTACK - Open-collector signal from data access memory board to data access processor board. The falling edge of this signal indicates that valid data is available on the data bus during a read cycle, or that data has been accepted during a write cycle. Advice such as a 74LS38 available from Texas Instruments, Inc. is used to produce the open-collector signal. |
| INT L | INTERRUPT - Open-collector signal from the data access memory board to the data access processor board when an unrecoverable memory data error is encountered. This signal generates a Level 7 interrupt of the MC 68000 on the data access processor board. |

TABLE 4-continued

| MNEMONIC | Definition of Lines in Local Bus<br>NAME - Definition |
|---|---|
| ERROR L | BUS ERROR - Open-collector signal from the data access memory board to the data access processor board when a bus cycle must be aborted. |
| CE L | CORRECTABLE ERROR - Open-collector signal from the data access memory board to the data access processor board when a recoverable error occurs. |

In FIG. 20, the INT, ERROR and DTACK lines have been shown individually, while the other lines mentioned above are represented as the CTRL lines. The control lines are routed through control gating circuitry 204 that is connected by control lines to the memory controller circuit 202.

Circuitry on the data access memory board is selected and enabled when the board is addressed. The address on certain high order lines of the address bus is transmitted to and decoded by a programmable logic device (PLD) decoder 205. Preferably, this includes one or more programmable array logic (PAL) devices available from Monolithic Memories.

Enable lines such as MEM. CTRL ENABLE, EDC ENABLE, PRELOAD ENABLE and ENABLE carry signals to enable the other circuits on the board in response to an incoming address. Because the data access memory board appears to the data access processor board as an asynchronous port, the control gating circuitry is arranged to receive control signals from the circuits on the data access memory board and in response to these control signals, the control gating circuitry returns the DTACK signals within a certain time limit to signal the MC 68000 MPU that a memory write cycle has been completed.

Address lines carrying the lower bits of address sufficient to address the 2 Mb memory array 203 are connected to the memory controller circuit 202. The memory controller circuit 202 is an Model 8207 DRAM Controller available from Intel Corporation, Santa Clara, Calif. The memory controller circuit 202 is configured during startup operations by control data that is written to a preload register 206 through the local data bus. The preload register 206 is addressed through the PLD decoder 205.

The data access processor board transmits a sixteen-bit word of control data to the preload register 206. After this word is loaded the data access processor board transmits a reset pulse through the control lines to the memory controller circuit 202. This causes the memory controller circuit 202 to issue clock pulses to the preload register 206 to read bits of the control data in serial fashion. These bits determine the error correction mode, certain timing parameters, and certain memory configuration parameters as specified in more detail in the specification sheets available from Intel for the Model 8207.

The memory controller circuit 202 is also connected through control lines to an error detect/correct circuit 207 which in this embodiment is the Model 8206, a companion circuit available from Intel Corporation. Once the preload control data is read into the memory controller circuit 202, it initializes the memory circuits. It also signals the error detect/correct circuit 207 to put zeroes onto the data bus and these are loaded into the memory locations as the memory controller circuit 202 sequences through the full range of memory addresses.

During memory write operations, the error detect/correct circuit 207 receives 16-bit data words as they are written to the DRAM array 203. It then calculates a 6-bit error correction code which is added to the data to form a 22-bit word in memory. The error detect/correct circuit 207 has six outputs connected to inputs on the DRAM array 203, and during memory write operations, it provides the 6-bit code in parallel to the data on the data bus.

During read operations, data is piped through the error detect/correct circuit 207 until an eeror is detected. The DRAM array 203 has outputs for twenty-two bits connected to another set on inputs on the error detect/correct circuit 207. During read operations, the sixteen bits of data and the 6-bit error code are read from the memory and compared by the error detect/correct circuit 207. The error detect/correct circuit 207 then signals the memory controller circuit 202 through the control lines to switch to a read-modify-write mode in which an erroneous bit of data can be corrected and the corrected data will be stored in memory and transmitted on the data bus to the DAP board.

The Access Machine Processor (APA) Module

Figure 21:
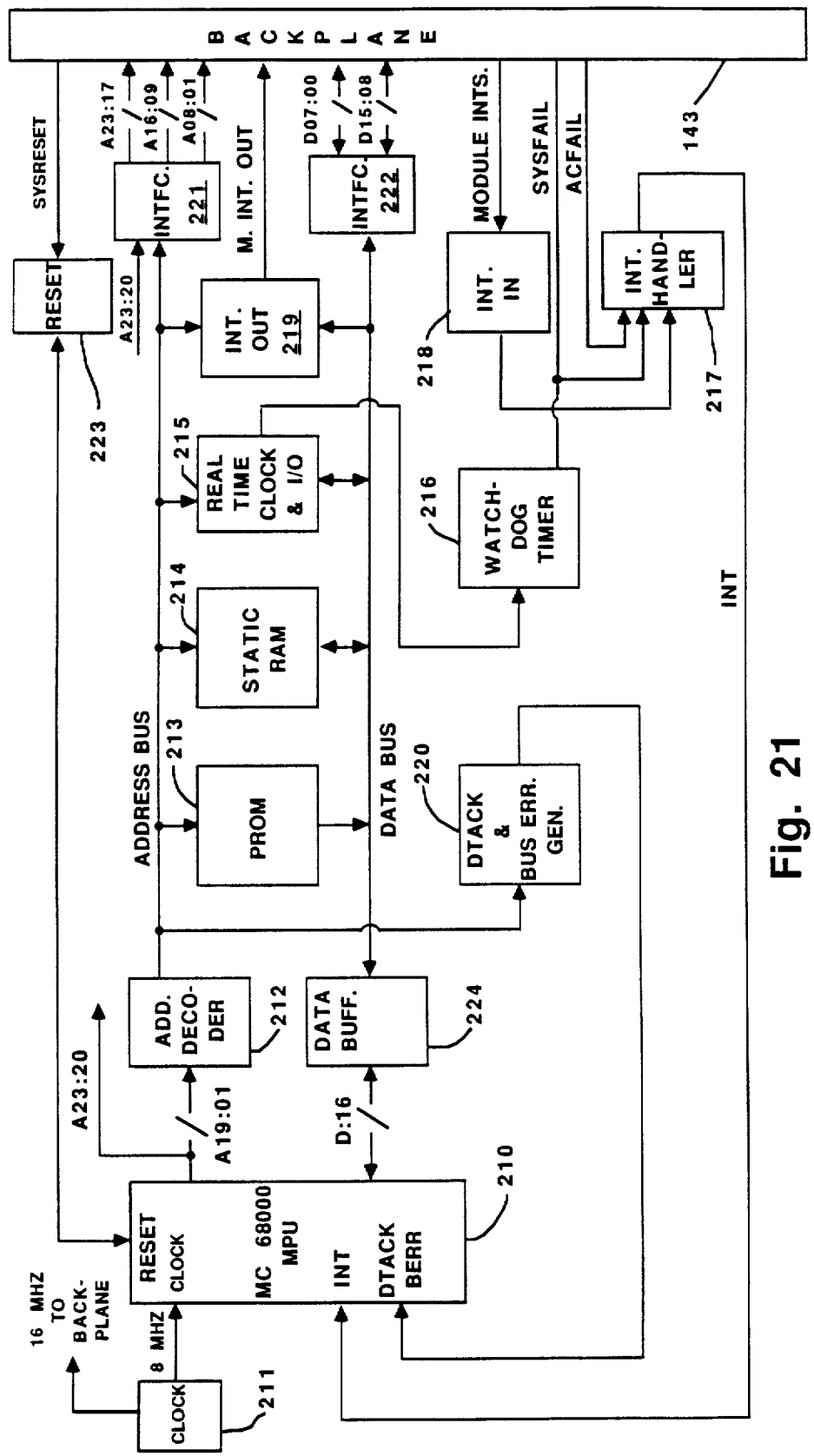
FIG. 21 is a schematic diagram of the circuitry in an access machine processor module seen in FIG. 16.

The access machine processor module 148 is the CPU of the access machine. It communicates through the backplane 143 with the DAP module 146 and the LAN interface module 147. Referring to FIG. 21, the operations of access machine processor module 148 are directed by a microelectronic MPU 210, which like the MPU on the DAP module 146 is a Model MC 68000 available from Motorola Semiconductors. A clock circuit 211 provides clock signals to a CLOCK input on the MPU 210 at a frequency of 8 MHz. The clock circuit also provides signals to the backplane at a 16 MHz frequency, and these are divided down to suitable frequencies by other circuitry in the access machine.

The MPU 210 has a 23-bit address bus (A:23) of which lines A19:01 are connected to an address decoder 212. The MC 68000 does not provide an A0 address line. Instead it uses upper data strobe (UDS) and lower data strobe (LDS) signals to control byte transfers.

The address decoder 212 includes two 82S100 field programmable logic arrays (FPLA) available from Sig-netics Corporation and other sources. The address of the circuits on the access machine process module 148 can be assigned by programming the FPLA's as desired. In this embodiment, the 16-Megabyte address space of the MC 68000 is divided as seen in the following Table 5.

TABLE 5

| 68000 Address Space | |
|---|---|
| Address Range | Function |
| 000000-01FFFE | PROM |
| 030001-03001F | Reserved |
| 032001-03200F | Timer Registers |
| 034XXX | Set up address for RTC |
| 034201 | Read or write for RTC |
| 036001 | Input Port Register (Read) |
| 036001 | Output Port Register (Write) |
| 03A000 | Interrupt Out Register |
| 03C000 | Board Number Register Word |
| 100000-11FFFE | Rack Slot, Periph. Module |
| 120000-13FFFE | Rack Slot, Periph. Module |
| 140000-15FFFE | Rack Slot, Periph. Module |
| 160000-17FFFE | Rack Slot, Periph. Module |
| 1FFFFE | Control register for off-board RAM |
| 220000-27FFFE | Off-board SRAM |
| 280000-29FFFE | Off-board dynamic RAM |

TABLE 5-continued

| 68000 Address Space | |
|---|---|
| Address Range | Function |
| 2A0000–2FFFFE | On-board static RAM (SRAM) |
| 400000–FFFFFE | Decoded bus error |

Several notes should be made about the above table. "XXX" (hex) is 000YYYYYYYYZ in binary where "0" is a logical zero, "YYYYYYYY" is the RTC address and "Z" is a don't care. And, the addresses at 100000 (hex) and up are transmitted to circuitry on other modules rather than to the address decoder 212.

The FPLA's in the address decoder 212 also decode signals on three function decode lines FC0–FC2, which are standard lines for the MC 68000. These decode lines signal the decoder 212 to stop decoding addresses during an interrupt acknowledge cycle.

The access machine processor module 148 has a programmable read-only memory (PROM) 213 of 128K bytes on its processor board. Also on-board the processor board in FIG. 21 is a static random access memory (SRAM) 214. A memory board (not shown) is also connected to the APA processor board through the backplane 143. This board contains up to 512K bytes of RAM, either static or dynamic RAM or a combination of both, and this is an amount that will suffice to carry out the functions of the access machine processor module 148. In this embodiment, dynamic RAM is preferred and thus the memory board for the access machine processor module 148 has a DRAM controller similar to that described for the memory board in the DAP module 146. One difference is that the memory board for the access machine processor module 148 is connected to the processor board through the backplane 143 rather than a local bus.

The PROM 213 stores a startup program and can store programs for overseeing some communication functions. Parts of the program for carrying out communications with the peripheral modules 146, 147 can be loaded into RAM for faster execution. The MPU 210 reads program instructions by generating addresses in the range set forth above and by reading the program information through a data bus of sixteen lines (D:16). The data bus is coupled to the memory circuits 213, 214 and to other circuitry on the module 148 through two sets of data buffers represented by block 224.

In addition to the address and data buses, certain control lines of a type specified for the MC 68000 are connected to control various inputs on the memory circuits in executing read and write operations. The MPU 210 generates control signals such as upper data strobe (UDS), lower data strobe (LDS), address strobe (ADS) and read/write (R/W). These signals are also coupled to the backplane 143 through the interface circuit 222 although this has not been shown. For a description of all of the control lines applicable to the 68000, reference is made to the literature on the 68000 available from Motorola and other sources.

Certain control lines come on to the access machine processor module 148 from the backplane 143. These include the SYSRESET line which is connected to a RESET circuit 223, which has an output connected to a RESET input on the MPU 210. The line from the RESET circuit 223 to the RESET input is bidirectional so the MPU 210 can reset other circuitry on the access machine processor module 148. A SYSFAIL line and an ACFAIL line are coupled through backplane buffers (not shown) to an interrupt handler circuit 217.

A real time clock and I/O port circuit 125 is also connected to the address and data buses. The real time clock circuit 215 has its address and data combined in a multiplexed bus that is connected to the ADDRESS BUS and to the DATA BUS in FIG. 21 through an extra set of bus buffers that have not been shown. The real time clock circuit 215 develops timing signals for any programmable time base desired by the MPU for timing functions.

The circuit 215 also includes an input port register for reading fault conditions and for reading interrupt signals from the real time clock. An ALS245 latch available from Texas Instruments, Inc. and other sources is a suitable choice for this circuit. An output port register, which is preferable an ALS273 latch available from the same sources, is provided to receive bits such as the bit for restarting an MPU watchdog timer 216.

The MPU watchdog timer 216 is a circuit of a well-known type in which a monostable multivibrator will time out unless it is reset by a signal from the MPU within the timeout period. The timeout period is selected to be slightly more than thirty milliseconds. If the watchdog timer times out, it generates an interrupt signal to the MPU 210 through the SYSFAIL line and the interrupt handler circuit 217.

The following Table 6 is a summary of the interrupt sources and priority levels of interrupts generated to the MPU 120.

TABLE 6

| Priority of Interrupts | |
|---|---|
| Priority Level | Interrupt Source |
| 7 | AC Power Fail |
| 6 | System Fail |
| 5 | Watchdog Timer |
| 3 | Software Timer Interrupt |
| 2 | Interrupt A from Slave Module |
| 1 | Interrupt B from Slave Module |

Peripheral modules such as the DAP module 146 and the LAN interface module 147 are each connected through the backplane 143 to the access machine processor module 148 by two interrupt lines for two levels of interrupts. These are lines collectively represented as MODULE. INTS. lines in FIG. 21. These lines are connected as inputs to a peripheral interrupt handler (INT. IN) circuit 218. This circuit 218 includes a pair of F374 latches (Fairchild Semiconductor and other sources) for double buffering the interrupt signals. When an interrupt is being serviced, the clock signal to the second latch is removed to keep the data in the latch stable, while the first latch is still available to receive further interrupts from the peripheral modules.

Within each level of interrupt, the interrupts are given priority through a logic circuit included in the INT. IN circuit 218. The outputs of the latches for one set of lines from the modules are OR'ed together to form a level "1" interrupt to the MPU 210. The outputs of the latches for a complementary set of lines from the peripheral modules are OR'ed together to form a level "2" interrupt to the MPU 210. Through this logic, the module in the rack slot closest to the access machine processor module 148 is given the highest priority and the module in the rack slot the furthest from the access machine processor module 148 is given the lowest priority. Under this arrangement, the LAN interface module 147 module receives a higher priority than the DAP module 146.

The INT. IN circuit 218 also includes an interrupt acknowledge circuit in the form of an FPLA which receives address signals A1–A3 and function code signals FC0–FC2 from the MPU 210 as inputs. The function code signals specify an interrupt cycle while the address signals determine the level of interrupt. The FPLA also receives the MODULE INTS. signals and in response to these and the other signals just mentioned it will generate an acknowledge signal to the appropriate module.

The interrupt signals from circuit 218 are transmitted to a general interrupt handler circuit 217 for the MPU 210. Besides outputs from the circuit 218, this circuit 217 receives the SYSFAIL and ACFAIL interrupt signals from the backplane 143. The MPU watchdog timeout signal is OR'ed with the SYSFAIL signal from the backplane 143. The circuit 217 also includes a pair of F374 latches for double buffering the seven levels of interrupts from "1" to "7". When an interrupt is being serviced the clock to the second latch is removed to keep the data in the second latch stable. The output of this latch is connected through interrupt lines (INT) to the MPU 210.

Interrupts from the peripheral modules 146, 147 are accompanied by a vector on the data bus during the interrupt acknowledge cycle. This vector is read by the MPU 210 to locate an appropriate interrupt service routine in memory. When one of the other interrupts is generated to circuit 217 an autovector control signal is generated by logic circuitry in the circuit 217. This signals the MPU 210 to go to a software routine based only on the level of interrupt from "1" to "7" and without a further vector number. Such autovector circuits are described in the literature available for the MC 68000.

The MPU 210 can also generate interrupts to the peripheral modules through an interrupt output (INT. OUT) circuit 219. There are sixteen lines on the backplane 143 controlled by this circuit 219, four lines for each peripheral module. When an interrupt bit is set in the register an interrupt is generated on one of these lines. This circuit includes two ALS 273 latches to hold data selecting the interrupt and a one-shot timer for clearing the latches and limiting the period of the interrupt singal to 2.5 microseconds. The clearing of the latches prevents the generation of one interrupt to a module while another is still pending. The ALS 273 latches are available from Texas Instruments, Inc. and other sources.

Each of the circuits on the processor board as well as the peripheral boards and the memory board must provide a DTACK L (data acknowledge) signal back to the MPU 210 to signal a successful data access. A peripheral module may also provide a BERR L (bus error) signal if it determines that there is a bus related error during an access. An example of a bus related error would be generation of an address to a peripheral module that is not present on the peripheral module.

There are three DTACK generators on board the processor module. The first DTACK generator is the the address decoder 212 which can assert the DTACK signal for circuits such as the PROM 213 with no wait states. A second DTACK generator represented by block 220 is enabled through the address decoder 212, but it allows selectable wait states. The third DTACK generator is provided for the real time clock circuit 215 and this generator allows for a programmable time delay, but only for the real time clock circuit 215. The outputs of the three DTACK circuits are OR'ed together in the circuit 220 to provide a DTACK input to the MPU 210.

The DTACK and BUS ERROR circuit 220 includes a one-shot multivibrator that serves as a bus watchdog timer. Each time an address strobe signal from the MPU 210 goes low, the bus watchdog timer is restarted. It will time out at about 30 microseconds from the falling edge of the address strobe and will then generate a BUS ERROR signal to a BERR input on the MPU 210. THe bus error circuitry is coupled to the DTACK circuit so that a DTACK signal will retrigger the bus watchdog. Also, if a bus error signal is generated, the logic in the circuit will prevent the return of a DTACK signal to the MPU 210. Control signals received through the backplane 143 include the DTACK and BERR signals from offboard circuits and these are OR'ed in circuit 220 with the DTACK and BERR signals from on-board sources.

The interface circuits 221 and 222 are buffers for the address and data lines to the backplane 143. LS645-1 circuits available from Texas Instruments, Inc. and other sources are suitable for this purpose. The address buffers 221 are wired for one-directional drive onto the backplane 143, while data buffers 222 are provided for transfer in two directions—to and from the backplane 143. The direction in which the data buffers 222 are enabled is controlled through a control line from the address decoder 212, which also decodes read/write control signals from the MPU 210.

LAN Interface Module

Figure 22:
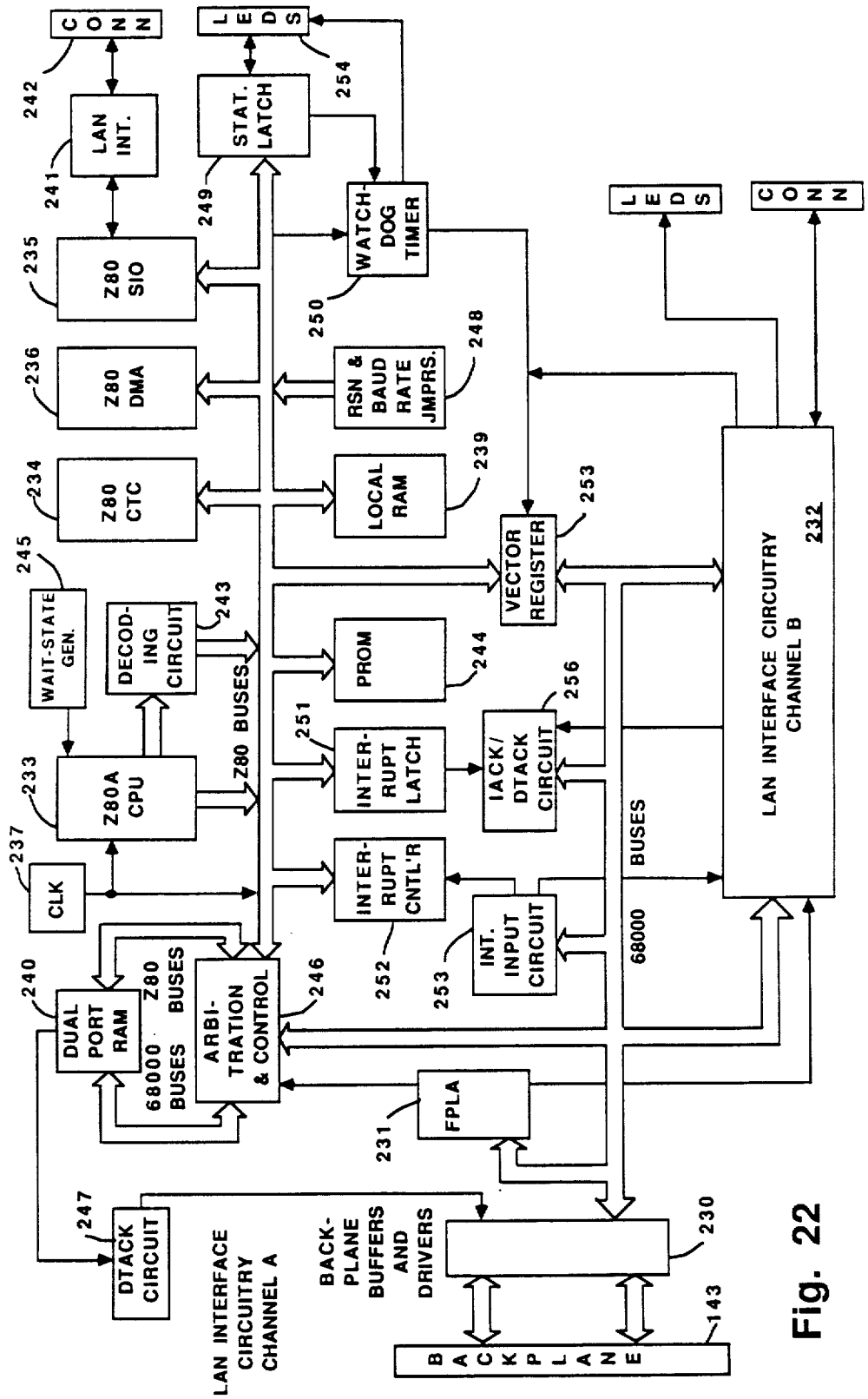
FIG. 22 is a schematic diagram of the circuitry in a local area network interface module seen in FIG. 16.

Referring to FIG. 22, the LAN interface module 147 has two communication channels A and B for servicing two local area networks LAN's. A set of backplane buffers and drivers 230 and an FPLA decoder 231 serve both channels. Otherwise, the circuitry blocks in FIG. 22 relate to channel A and these blocks would be duplicated within the general block 232 representing the channel B circuitry.

Channels A and B are each directed by a microelectronic CPU 233, which is preferably a Z80A CPU available from Zilog, Inc. The Z80 CPU is used with several companion circuits, also available from Zilog, Inc., and these are the Z80 CTC (clock timing circuit) 234, the Z80 SIO (serial input/output) circuit 285 and the Z80 DMA (direct memory access) circuit 236. The Z80 CTC circuit 234, the Z80 SIO circuit 235 and the Z80 DMA circuit 236 are sophisticated peripheral circuits, and for a full explanation of their architecture, control and operation reference is made to the manuals of these circuits that are available from Zilog, Inc. Reference is also made to the manual on the Z80A CPU and other literature in the art for a full description of the architecture, operation and programming of this circuit.

A clock circuit 237 provides a clock signal of 3.6864 MHz to the CPU 233. This circuit 237 also provides a 1.8432 MHz signal to the Z80 CTC circuit 234 for use as its Channel 3 time base. The clock circuit 237 also provides a 921.6 KHz signal to the Z80 CTC circuit 234 for use as a baud rate time base.

The Z80 CTC circuit 234 has four channels for timing functions. In this embodiment channel 0 provides baud rate generation and is driven by a 921.6 KHz signal. Channel 1 is not used. Channel 2 is programmed by control data from the CPU to provide a 460.8 (baud rate×8) signal used by the clock recovery circuitry in circuit 241. This signal is also divided by eight to provide the transmit clock. Channel 3 generates a 1.8432 MHz signal used by the Z80A CPU for system timing functions.

The Z80 SIO circuit 235 is serial-to-parallel and parallel-to-serial data converter. It is programmable by data from the Z80A CPU to handle serial data according to various communication protocols. The Z80 SIO circuit 235 also provides a mode of operation for operation with the Z80 DMA circuit 236. While the Z80 SIO circuit 235 is a two-channel device, only one of the SIO channels is used in each of the communication channel circuits on the LAN interface module 147.

The Z80 DMA circuit 236 transfers incoming data from the Z80 SIO circuit 235 to a local RAM 239. It transfers outgoing data from a dual port RAM 240 to registers in the Z80 SIO circuit 235. In performing these transfers the Z80 DMA circuit 236 uses the byte-at-a-time bus release mode.

The Z80A CPU 233 has been utilized with the Z80 CTC circuit 234 and the Z80 SIO circuit 235 to operate serial channels in several prior U.S. patent documents including U.S. Pat. No. 4,319,338, and reference is made to this patent for a description of the connection and cooperation of these circuits. In addition, U.S. Pat. No. 4,319,338 describes the network protocol and operation of local area network (LAN) of the type used in the preferred embodiment.

There are two basic differences between the present LAN interface module 147 and the module described in the abovementioned patent. First, the communication channel circuitry for channels A and B has incorporated the Z80 DMA circuit 236, which will allow data transfers between the LAN's and certain memory circuits on-board without requiring the direct supervision of the Z80 CPU 233. And second, the communication channel circuitry for channels A and B is interfaced to the backplane 143 through a specific interface designed for the MC 68000 MPU on the APA module 148.

An LAN interface circuit 241 of a type shown in FIG. 5 of U.S. Pat. No. 4,319,338 couples a network connector 242 for one LAN to the Z80 SIO circuit 235. The LAN interface circuit 242 includes isolation transformers for coupling a transmitter and a receiver to the LAN, circuitry to detect activity on the LAN, circuitry for recovering timing signals from incoming Manchester-encoded data and circuitry for transmitting data on the LAN as Manchester-encoded serial data.

The Z80A CPU uses an 8-bit data bus and a 16-bit address bus (included in the Z80 BUSES of FIG. 22) to address 64K bytes of information. The address space of the Z80A CPU is allocated as seen in Table 7 below.

TABLE 7

| Z80 Address Space | |
|---|---|
| Address Range | Function |
| 0000-7FFF (hex) | PROM |
| 8000-BFFF | Dual port RAM |
| C000-DFFF | Not used |
| E000-FFFF | Local RAM |

The Z80A CPU generates addresses on its address bus to a decoding circuit 243. This circuit 243 includes two 74ALS373 latches which latch address signals during memory cycles. These latch outputs are disabled when memory accesses are controlled by the Z80 DMA circuit 236. I/O decoding is provided by 74LS138 3-to-8 line decoders. The Z80A CPU uses only the lower eight bits of address bus for I/O port addresses.

The memory circuits on the LAN interface module 147 include PROM circuits 244, local RAM circuits 239 and dual port RAM circuits 240. The PROM circuit for each channel may be a circuit providing 16K bytes of storage. The PROM 244 stores a program of instructions that are executed by the Z80A CPU. A local RAM of 8K bytes is provided for each channel. The PROM 244, local RAM 239 and dual port RAM 240 are connected to the Z80A CPU through the Z80 buses and suitable control lines for executing memory access operations.

As part of the control circuitry, several wait state generator circuits 245 are provided to insert wait states in the memory access cycles where the memory circuits are slower than the Z80A CPU. The wait state circuits 245 are provided by 74ALS74 latches. The timing and control signals to the memories are routed through these circuits to produce the wait states. When the Z80 DMA circuit 236 is controlling the Z80 buses, it has access to a WAIT control line to insert wait states in its memory access cycles.

The dual port RAM 240 includes two HM6264LP-150 8K×8 byte CMOS RAM circuits. From the viewpoint of the MC 68000 MPU on the APA module 148, the dual port RAM 240 appears as 8K×16-bits. One RAM circuit is accessed using the upper data strobe (UDS) signaL while the other RAM is accessed using the lower data strobe (LDS) signal. From the Z80 side the dual port RAM 240 appears as 16K×8-bits. Data strobe signals are logically generated using address line AO and a Z80 DPRCS line to provide an upper data strobe and a lower data strobe to be consistent with the viewpoint of the other processor.

Two sets of buffers, logically located on each side of the dual port RAM 240 control the gating of proper CPU signals to the dual port RAM 240. Groups of 74ALS244 octal buffers handle the address and control signals. Four 74ALS245 bidirectional data selectors enable the appropriate data bus and select the direction of data transfer. The proper bank of buffers is selected by a signal from the arbitration circuit 246.

The arbitration circuit 246 includes a clock running at 16 MHz that gates memory access requests from the Z80A CPU and the MC 68000 MPU on opposite edges of each clock pulse. A pair of 74F74 flip-flops available from Fairchild Semiconductor and other sources is connected to cross-couple the request signals from the respective processor. A pending request will be latched by one of these circuits, but it will not be effective until the circuitry is released from the active grant signal of a request from the other processor. The MC 68000 is locked out by holding off its DTACK signal through the DTACK circuit 247 for the dual port RAM 240 shown in FIG. 22. The Z80A CPU is locked out by asserting its WAIT signal.

Each channel of the LAN interface circuitry has its own section in the dual port RAM 240, however, both of these sections are interfaced to the backplane 143 through a common interface. The twenty-three address lines (A1-A23), three function code lines (FC0-FC2) and the other incoming control lines of the 68000 are buffered by 74LS244 receivers. The sixteen data lines (D0-D15) are buffered through 74LS645-1 bidirectional data transceivers. The address lines A14-A23, the function code lines FC0-FC2 and two slot assignment lines SLA 1 and SLA 2 (similar to the DAP module 146) are coupled to an 82S100 FPLA decoder to decode off-board dual port RAM addresses. The dual port RAM 240 is mapped into an address space of the 68000 in the range above 100000 (hex) according to the slot in which the LAN interface module 147 is located.

The Z80A CPU 233 can access a number of I/O ports or registers using its control lines and the address bus, and these are summarized in Table 8 below.

TABLE 8

| Z80 I/O Map | | |
|---|---|---|
| Address (Hex) | Dir. | Register |
| 00 | R/W | SIO Channel A Data |
| 01 | R/W | SIO Channel B Data |
| 02 | R/W | SIO Channl A Control/Status |
| 03 | R/W | SIO Channel B Control/Status |
| 10 | R/W | CTC Channel 0 Control |
| 11 | R/W | CTC Channel 1 Control |
| 12 | R/W | CTC Channel 2 Control |
| 13 | R/W | CTC Channel 3 Control |
| 20 | R/W | DMA Base Register |
| 30–3F | W | Status Latch |
| 40 | R | Baud Rate Jumpers |
| 50 | R | Real Station Number |
| 60 | R/W | Interrupt Channel 0 Conrrol |
| 61 | R/W | Interrupt Channel 1 Control |
| 62 | R/W | Interrupt Channel 2 Control |
| 63 | R/W | Interrupt Channel 3 Control |
| 68 | W | Vector Register |
| 70–7F | W | Interrupt Latch |

R = Read
W = Write

A real station number (RSN) is provided by jumpers which are included on the board in a circuit 248. Jumpers are also provided to select the address of each LAN channel. Jumpers are also provided to set one of the two baud rates. All of these jumpers are coupled through buffers to the Z80 data bus so that the selected numbers can be read by the Z80A CPU.

A status latch 249 provides an output register for controlling a group of status LED's 254 and several other signals for signalling circuitry such as a CPU watchdog timer circuit 250. A second addressable latch referred to as an interrupt latch 251 is available to receive control data to initiate interrupts of the Z80A CPU and of the MC 68000 CPU on the APA module 148.

The watchdog timer circuit 250 is of a type well known in the art in which a retriggerable one-shot multivibrator is periodically restarted as a signal that the Z80A CPU is executing its program instructions in an expected fashion. This particular watchdog timer circuit 250 is set to time out in about four milliseconds if not retriggered through the status latch 249. The watchdog timer circuit 250 also has a second timer which is periodically retriggered from the M1 control output on the Z80A CPU.

The interrupts that occur on the LAN interface module 147 can be divided into two categories, those that originate on-board and those that originate on the APA module 148.

The Z80A CPU 233 can receive non-maskable interrupt (NMI) signals in response to an ACFAIL signal from the system power supply or in response to a WAIT/RDYA signal from the Z80 SIO circuit 235. A non-maskable interrupt causes the Z80A CPU to restart the execution of its program from PROM.

The Z80A CPU is also wired to respond to maskable, vectored interrupts in Mode 2 of the Z80 interrupt modes. In this known mode of operation external circuits are daisychained to another interrupt input on the Z80A CPU to establish a priority of interrupts. In this case, the Z80 SIO circuit 235 has the highest priority, followed by the Z80 DMA circuit 236, the Z80 CTC circuit 234 and lastly an interrupt controller circuit 252.

Within each of these categories of interrupts each interrupting circuit provides multiple interrupts which are also associated with a relative priority. For example, the Z80 SIO circuit 235 communicates with the Z80A CPU according to various routines for receiving and transmitting data over the LAN, with the receiver interrupt having a higher priority than the transmission interrupt. During an interrupt acknowledge cycle above interrupting circuits transmit an 8-bit vector on the Z80 data bus which is read into a register in the Z80A CPU to form an address to the next instruction to be executed. In addition, the Z80A CPU can interrupt itself by writing a bit to the status latch.

The interrupt controller circuit 252 is actually a second Z80 CTC circuit with three trigger inputs wired to receive two successive interrupts from the off-board MC 68000 and a third, scheduler interrupt from the Z80A CPU 233. The CTC circuit is programmed with control data from the Z80A CPU to respond to these interrupts, and vectors are loaded by the Z80A CPU into the appropriate vector registers.

To allow the off-board MC 68000 to interrupt the Z80A CPU, four lines are routed through the backplane 143 to provide two interrupts for each channel of the LAN interface circuitry. These interrupt signals are received through an interrupt input circuit 253 which includes a 74LS244 buffer circuit. These interrupt signals are inverted and then used to clock 74HC74 flip-flops to generate the interrupt signals to the interrupt controller circuit 252.

The Z80-to-68000 interrupt circuitry includes the interrupt latch circuit 252, a programmable vector register 255 and an IACK/DTACK circuit 256. The Z80A CPU 233 initiates the interrupt by writing control data to the interrupt latch circuit 253. This circuit includes 74F74 latches and also includes flip-flop logic and timing circuitry to arbitrate between signals from the "channel A" Z80A CPU and the "channel B" Z80A CPU included in circuit 232. The MC 68000 generates signals as part of its interrupt acknowledge cycle to the IACK/DTACK circuit 256. In responding to an interrupt signal from the MC 68000, the Z80A CPU 233 must provide an 8-bit vector on the 68000 backplane data bus from the programmable vector register 255 (74ALS374) and terminates the interrupt acknowledge cycle with a DTACK signal from the IACK/DTACK circuit 256.

This concludes the detailed description of the three modules 146–148 in the access machine. Although many details have been given herein by way of example, it will be apparent to those skilled in the art that these may be varied in other embodiments without departing from the invention. Therefore, to apprise the public of the scope of the invention the following claims are made.

We claim:

1. An access machine computer which is a first of a plurality of access machine computers for connection in a factory automation cell that includes a cell controlling computer and a plurality of station-level computers located at a corresponding plurality of stations, the plurality of station-level computers including at least one station-level computer controlling an industrial machine in real time, the first access machine computer comprising:

an access machine module outside the cell controlling computer for communicating upstream within the factory automation cell to the cell controlling computer and for communicating downstream within the factory automation cell to a plurality of station-level computers, the access machine module including database means for storing at least a portion of a database associated with the first access machine computer, the database including data items, computer accessing the data items on a basis that is independent of the addresses which are assigned to the data items at the stations for reference by respective station-level computers;

first network communication means coupled to the database means for communicating the data items associated with the first access machine computer through a first network communication link to and from the cell controlling computer via messages in which data items are stored in and retrieved from the database independent of the addresses which are assigned at the stations at which the data items are monitored or controlled;

second network communication means for communicating the data items through a second network communication link to and from the station-level computers via messages which include station-related blocks of information that are related to addresses of the stations of the respective station-level computers; and database interface means interfacing the database means to the second network communication means for translating the data items between the station-related blocks of information and the station-independent organization of the database.

2. The access machine of claim 1 in which each data item includes a field of tag data that is unique within the factory automation cell and in which the data items are accessed via the tag data.

3. The access machine of claim 1, wherein the first network communication link is a first local area network.

4. The access machine of claim 1, wherein the second network communication link is a second local area network.

5. The access machine of claim 1, further comprising means coupled to the first network communication means to receive and load the database into the database means.

6. An access machine computer which is a first of a plurality of access machine computers for connection in a factory automation cell that includes a cell controlling computer and a plurality of station-level computers located at respective stations, the plurality of station-level computers including at least one computer controlling an industrial machine in real time, the first access machine computer comprising:

a data access link processor module including database means for storing at least a portion of a database associated with the first access machine computer, the database including data items which are associated with stations of respective station-level computers during communication to and from the stations, the cell controlling computer accessing the data items on a basis that is independent of the addresses which are assigned to the data items at the stations for reference by respective station-level computers, first network communication means coupled to the database means for communicating the data items associated with the first access machine computer through a first network communication link to and from the cell controlling computer via messages in which data items are stored in and retrieved from the database independent of the addresses which are assigned at the stations at which the data items are monitored or controlled, second network communication means for communicating the data items through a second network communication link to and from the station-level computers via messages which include station-related blocks of information that are related by station to the respective station-level computers, and database interface means interfacing the database means to the second network communication means for translating the data items between the station-related blocks of information and the station-independent organization of the database;

a communication link interface module including third communication means for communicating the messages with station-related blocks of information associated with the respective station-level computers through a second communication link to and from the station-level computers; and means for conveying the messages with station-related blocks of information associated with the respective station-level computers between the data access processor module and the communication link interface module.

7. The access machine of claim 6, wherein the first network communication link is a first local area network.

8. The access machine of claim 6, wherein the second network communication link is a second local area network and wherein the communication link interface module is a local network interface module.

9. The access machine of claim 6 in which each data item includes a field of tag data that is unique within the factory automation cell and in which the data items are accessed via the tag data.

10. An access machine which is a first of a plurality of access machines for connection in a factory automation cell that includes a cell controlling computer and a plurality of station-level computers located at a corresponding plurality of stations, the plurality of station-level computers including at least one station-level computer controlling an industrial machine in real time, the first access machine comprising:

an access machine module outside the cell controlling computer for communicating upstream within the factory automation cell to the cell controlling computer and for communicating downstream within the factory automation cell to a plurality of station-level computers, the access machine module including database means for storing a database in which data items are associated with respective station-level computers, computer accessing the data items on a basis that is independent of the addresses which are assigned to the data items for reference by the respective station-level computers;

first network communication means coupled to the database means for receiving a configuration message associated with the first access machine through a first network communication link from the cell controlling computer, wherein the configuration message includes a new data item to be added to the database;

second network communication means for communicating data items through a second network communication link to and from the station-level computers via messages which include station-related blocks of information that are related to addresses of the stations of the respective station-level computers;

database interface means for interfacing the database means to the second network communication means, the database interface means including linkages between the station-related blocks of information and the station-independent organization of the database; and database on-line configuration means responsive to receipt of the configuration message through the first network communication link for storing the new data item in the database means and for establishing a corresponding linkage in the database interface means between the station-related blocks of information and the station-independent organization of the database.

11. The access machine of claim 10, wherein the first network communication link is a first local area network.

12. The access machine of claim 10, wherein the second network communication link is a second local area network.

13. The access machine of claim 10 in which each data item includes a field of tag data that is unique within the factory automation cell and in which the data items are accessed via the tage data.

* * * * *

UNITED STATES PATENT AND TRADEMARK OFFICE
CERTIFICATE OF CORRECTION

PATENT NO. : 4,831,582
DATED : May 16, 1989
INVENTOR(S) : William L. Miller, et al.

Page 1 of 3

It is certified that error appears in the above-identified patent and that said Letters Patent is hereby corrected as shown below:

| | |
|---|---|
| Column 3, line 1 | "emote stations" should be --the remote stations--. |
| Column 3, line 2 | "access machines" should be --the access machine--. |
| Column 3, line 3 | "en necessary" should be --when necessary--. |
| Column 3, line 4 | "ves the cell" should be --lieves the cell--. |
| Column 3, line 5 | "al-time" should be --real time--. |
| Column 3, line 6 | the first word is --computer--. |
| Column 4, line 44 | "to how to" should be --is how to--. |
| Column 4, line 27 | "or" should be --of--. |
| Column 6, line 27 | "too" should be --to--. |
| Column 7, line 7 | "00[ of" should be --"00" of--. |
| Column 7, line 10 | "Run B" should be --Rung B--. |
| Column 14, line 11 | "as" should be --is--. |

UNITED STATES PATENT AND TRADEMARK OFFICE
CERTIFICATE OF CORRECTION

PATENT NO. : 4,831,582

DATED : May 16, 1989

INVENTOR(S) : William L. Miller, et al.

It is certified that error appears in the above—identified patent and that said Letters Patent is hereby corrected as shown below:

Column 17, line 9     Add a comma after addressed.

Column 19, line 60    "LIS[" should be --LIST--.

Column 20, line 5     "Statins" should be --Stations--.

Column 20, line 18    "ae" should be --are--.

Column 20, line 37    "MACHIN" should be --MACHINE--.

Column 21, line 8     "trnsferred" should be --transferred--.

Column 22, line 15    "RM 171" should be --RAM 171--.

Column 22, line 25    Add "(" before ID:16

Column 24, line 37    "33Kx16" should be --32Kx16--.

Column 26, line 29    "LD15:1" should be --LD15:01--.

Column 30, line 31    "MPU 120" should be --MPU 210--.

Column 31, line 47    "singal" should be --signal--.

Column 32, line 12    "THe" should be --The--.

UNITED STATES PATENT AND TRADEMARK OFFICE
CERTIFICATE OF CORRECTION

PATENT NO. : 4,831,582

DATED : May 16, 1989

INVENTOR(S) : William L. Miller, et al.

It is certified that error appears in the above—identified patent and that said Letters Patent is hereby corrected as shown below:

Column 32, line 53   "of these" should be --on these--.

Column 37, line 13   Add "the cell controlling" before computer.

Column 40, line 20   "tage" should be --tag--.

Signed and Sealed this

Twenty-seventh Day of February, 1990

Attest:

JEFFREY M. SAMUELS

Attesting Officer      Acting Commissioner of Patents and Trademarks

UNITED STATES PATENT AND TRADEMARK OFFICE
CERTIFICATE OF CORRECTION

PATENT NO. : 4,831,582
DATED : May 16, 1989
INVENTOR(S) : William L. Miller, et al.

It is certified that error appears in the above—identified patent and that said Letters Patent is hereby corrected as shown below:

Column 38, line 65, before "computer" insert --the cell controlling--.

Signed and Sealed this

Third Day of September, 1991

Attest:

HARRY F. MANBECK, JR.

Attesting Officer

Commissioner of Patents and Trademarks